US012717091B2

(12) United States Patent
Guo et al.

(10) Patent No.: US 12,717,091 B2
(45) Date of Patent: Aug. 25, 2026

(54) FERRULE, FIBER CONNECTOR, AND FERRULE PRODUCTION METHOD

(71) Applicant: Huawei Technologies Co., Ltd., Shenzhen (CN)

(72) Inventors: Dan Guo, Dongguan (CN); Baoqi Wang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 481 days.

(21) Appl. No.: 18/069,613

(22) Filed: Dec. 21, 2022

(65) Prior Publication Data

US 2023/0127959 A1 Apr. 27, 2023

Related U.S. Application Data

(63) Continuation of application No. 16/989,083, filed on Aug. 10, 2020, now abandoned, which is a (Continued)

(30) Foreign Application Priority Data

Feb. 11, 2018 (CN) ......................... 201810143449.1

(51) Int. Cl.
*G02B 6/38* (2006.01)
*G02B 6/40* (2006.01)

(52) U.S. Cl.
CPC ......... *G02B 6/3847* (2013.01); *G02B 6/3882* (2013.01); *G02B 6/403* (2013.01)

(58) Field of Classification Search
CPC .... G02B 6/3821; G02B 6/262; G02B 6/3846; G02B 6/4203; G02B 6/3863
See application file for complete search history.

(56) References Cited

U.S. PATENT DOCUMENTS 4,714,318 A 12/1987 Hayashi et al.
5,071,218 A 12/1991 Nishimoto
(Continued)

FOREIGN PATENT DOCUMENTS

CN 1359476 A 7/2002
CN 1370282 A 9/2002
(Continued)

OTHER PUBLICATIONS

IEC 61300-3-35, Edition 2.0 Jun. 2015, Fibre optic interconnecting devices and passive components—Basic test and measurement procedures—Part 3-35: Examinations and measurements—Visual inspection of fibre optic connectors and fibre-stub transceivers, 46 pages.

(Continued)

*Primary Examiner* — Eric Wong
(74) *Attorney, Agent, or Firm* — Conley Rose, P.C.

(57) ABSTRACT

A ferrule includes a ferrule body and at least one fiber. The fiber is inserted into a through hole axially disposed in the ferrule body, a first end of the fiber is located inside the through hole, an end face of the first end of the fiber is below a plane on which a connection end face of the ferrule body is located, and a first preset distance is a vertical distance between the end face and the plane. The first preset distance causes two abutted ferrules to have a gap between the fibers.

21 Claims, 11 Drawing Sheets

Related U.S. Application Data continuation of application No. PCT/CN2018/120750, filed on Dec. 12, 2018.

(56) References Cited

U.S. PATENT DOCUMENTS

| | | | | |
|---|---|---|---|---|
| 5,796,894 | A * | 8/1998 | Csipkes | G02B 6/3821 385/38 |
| 6,123,463 | A | 9/2000 | Kashihara et al. | |
| 7,232,261 | B1 | 6/2007 | Nishumura et al. | |
| 8,905,648 | B2 | 12/2014 | Zhang | |
| 2001/0036341 | A1* | 11/2001 | Ohtsuka | G02B 6/25 385/85 |
| 2002/0186931 | A1 | 12/2002 | Seo et al. | |
| 2003/0179993 | A1 | 9/2003 | Shigenaga et al. | |
| 2004/0184716 | A1 | 9/2004 | Ducellier et al. | |
| 2006/0067611 | A1 | 3/2006 | Frisken et al. | |
| 2007/0292083 | A1 | 12/2007 | Nielson et al. | |
| 2011/0243508 | A1 | 10/2011 | Koreeda et al. | |
| 2012/0057869 | A1 | 3/2012 | Colbourne | |
| 2012/0236216 | A1 | 9/2012 | Sharma et al. | |
| 2013/0004129 | A1* | 1/2013 | Zhang | G02B 6/262 385/80 |
| 2013/0083402 | A1* | 4/2013 | Sanghera | G02B 6/255 359/601 |
| 2013/0163930 | A1* | 6/2013 | Jian | G02B 6/3846 385/60 |
| 2014/0185991 | A1 | 7/2014 | De Jong et al. | |
| 2017/0322382 | A1 | 11/2017 | Tateyama | |
| 2018/0045897 | A1 | 2/2018 | Chia et al. | |
| 2018/0301843 | A1 | 10/2018 | Lu | |
| 2018/0366868 | A1 | 12/2018 | Aoshima | |
| 2018/0372961 | A1* | 12/2018 | Alkeskjold | G02B 6/02328 |
| 2019/0353850 | A1 | 11/2019 | Asada et al. | |

FOREIGN PATENT DOCUMENTS

| | | | |
|---|---|---|---|
| CN | 1397812 | A | 2/2003 |
| CN | 202522734 | U | 11/2012 |
| CN | 203054268 | U | 7/2013 |
| CN | 103401609 | A | 11/2013 |
| CN | 203658623 | U | 6/2014 |
| CN | 104220912 | A | 12/2014 |
| CN | 102236134 | B | 4/2015 |
| CN | 105022185 | A | 11/2015 |
| CN | 204790070 | U | 11/2015 |
| CN | 204790072 | U | 11/2015 |
| CN | 204807754 | U | 11/2015 |
| CN | 205899079 | U | 1/2017 |
| CN | 205910378 | U | 1/2017 |
| CN | 104620155 | B | 3/2017 |
| CN | 104220912 | B | 9/2017 |
| CN | 105409140 | B | 12/2017 |
| CN | 206946033 | U | 1/2018 |
| CN | 108490550 | A | 9/2018 |
| EP | 1655988 | A2 | 5/2006 |
| JP | 3479964 | B2 | 12/2003 |
| KR | 20030000569 | A | 1/2003 |
| KR | 100712896 | B1 | 5/2007 |
| KR | 20070066375 | A | 6/2007 |
| WO | 2017087849 | A1 | 5/2017 |

OTHER PUBLICATIONS

IEC 61755-3-31, Edition 1.0 Jun. 2015, Fibre optic interconnecting devices and passive components—Connector optical interfaces—Part 3-31: Connector parameters of non-dispersion shifted single mode physically contacting fibres—Angled polyphenylene sulphide rectangular ferrules, 54 pages.

Search Report dated Sep. 13, 2018, issued in counterpart CN Application No. 201810143449.1.

International Search Report dated Feb. 27, 2019, issued in counterpart Application No. PCT/CN2018/120750, with English translation, 14 pages.

International Search Report dated Feb. 26, 2019, issued in counterpart Application No. PCT/CN2018/117385, with English translation, 11 pages.

Extended Supplementary European Search Report dated Feb. 19, 2021, issued in counterpart EP Application No. 18904761.6, 9 pages.

Office Action dated May 10, 2022, issued in counterpart CN application No. 202110552821.6, with English translation, 23 pages.

* cited by examiner

FERRULE, FIBER CONNECTOR, AND FERRULE PRODUCTION METHOD

CROSS-REFERENCE TO RELATED APPLICATIONS

This application is a continuation application of U.S. patent application Ser. No. 16/989,083, filed on Aug. 10, 2020, which is a continuation of International Patent Application No. PCT/CN2018/120750, filed on Dec. 12, 2018, which claims priority to Chinese Patent Application No. 201810143449.1, filed on Feb. 11, 2018. All of the aforementioned patent applications are hereby incorporated by reference in their entireties.

TECHNICAL FIELD

Embodiments of this application relate to the optical communications field, and in particular, to a ferrule, a fiber connector, and a ferrule production method.

BACKGROUND

In an optical communications system using a fiber as a transmission medium, connections between fibers of optical communications elements include a permanent connection and an active connection. The permanent connection is splicing, and the active connection is a connection using a fiber connector.

Existing fiber connectors on the market include a conventional mechanical transfer (MT) ferrule fiber connector, a lens ferrule fiber connector, a non-contact (NC) fiber connector, and the like. A fiber of a conventional MT ferrule fiber connector protrudes from a connection end face by 1 micrometer (μm) to 3.5 μm, and abutting is implemented through mechanical physical contact. The lens ferrule fiber connector expands a beam by using a front-end lens, to improve a dustproof capability and insertion/removal reliability of a product. For the NC fiber connector, fibers of two same NC fiber connectors are not in direct physical contact when the two same NC fiber connectors are connected to each other.

Because mechanical abutting is performed for the conventional MT ferrule fiber connector, the connection end face is worn and pollution is caused when the conventional MT ferrule fiber connector is inserted/removed a plurality of times. Such a fiber connector is unsuitable for scenarios in which a plurality of times of insertion/removal are required, cleaning is difficult or cleaning is unsuitable, and a reliability requirement is high, and is mainly applied to a board side or a panel side. The lens ferrule fiber connector has relatively large loss, and is inapplicable to a scenario with a relatively large quantity of link nodes. In addition, costs of the lens ferrule fiber connector are relatively high. Non-physical contact between fibers of the existing NC fiber connector and each type of fiber connector including a ferrule cannot be implemented when the two fiber connectors abut. Therefore, an insertion/removal force is large when the two fiber connectors abut, and a connection end face is worn and pollution is caused when insertion/removal is performed a plurality of times. In addition, a fiber of another fiber connector abutting the existing NC fiber connector is prone to touch a ferrule body of the NC fiber connector during abutting. Therefore, the fiber is worn, and insertion/removal reliability is low. To improve insertion/removal reliability, an NC fiber connector with very high precision needs to be produced, and therefore costs of the fiber connector are relatively high.

SUMMARY

Embodiments of this application provide a ferrule, a fiber connector, and a ferrule production method. During use of the obtained ferrule, transmission loss of a light wave is relatively small and a dustproof capability of the ferrule is relatively high. When a fiber connector including the ferrule in the embodiments of this application abuts any type of fiber connector including a ferrule, an insertion/removal force is small, insertion/removal reliability is high, and a requirement on production precision of the ferrule or the fiber connector is relatively low.

According to a first aspect, an embodiment of this application provides a ferrule, including a ferrule body and at least one fiber, where at least one through hole is axially disposed inside the ferrule body, each fiber is inserted into a corresponding through hole, a first end of the fiber is located inside the through hole, and a vertical distance between an end face of the first end of the fiber and a plane on which a connection end face of the ferrule body is located is a first preset distance, where the connection end face is an end face that is of the ferrule and that abuts another ferrule, and the first preset distance is a distance that can leave a gap between the fiber of the ferrule and a fiber of the another ferrule after the ferrule abuts the another ferrule; and the through hole includes a first section of through hole, a plane on which a top of the first section of through hole is located is the plane on which the connection end face is located, an area of any cross section of the first section of through hole in a direction vertical to the axial direction is greater than an area of the end face of the first end of the fiber, and a projection of the fiber in the axial direction does not coincide with a projection of the any cross section of the first section of through hole in the direction vertical to the axial direction.

In this solution, the area of the any cross section of the first section of through hole in the direction vertical to the axial direction of the ferrule body is greater than the area of the end face of the first end of the fiber, and the projection of the fiber in the axial direction does not coincide with the projection of the any cross section of the first section of through hole in the direction vertical to the axial direction. In other words, a size of a through hole close to the connection end face of the ferrule body is greater than a size of a first part of the fiber, and the fiber does not touch the body if the fiber extends from the first end in an axial direction of the fiber. In this case, when a fiber of a conventional MT ferrule abuts the ferrule in this embodiment, there is a low possibility that the fiber that is of the conventional MT ferrule and that protrudes from a ferrule body touches the connection end face of the ferrule body. Therefore, wearing of the fiber that is of the conventional MT ferrule and that protrudes from the ferrule body is reduced, and fiber stability is ensured. In other words, insertion/removal reliability between another ferrule and the ferrule in this embodiment is improved. In addition, a precision requirement on a position of the through hole of the used ferrule body is reduced, and ferrule production costs are reduced.

In an implementation, an anti-reflection coating is plated on an outer wall of the fiber located inside the first section of through hole, and a refractive index of the anti-reflection coating falls between a refractive index of air and a refractive index of the fiber. In this solution, through setting of the anti-reflection coating, transmission loss, in a non-fiber transmission medium, of a light wave emitted from the fiber of the ferrule in this aspect can be reduced. Therefore, after the ferrule abuts another ferrule, transmission loss of light is reduced without requiring fibers corresponding to the two ferrules to be in contact. In other approaches, a spring is disposed on a ferrule, so that each pair of corresponding fibers of two abutting ferrules can be in contact by using an elastic force of the spring. By comparison, when a fiber connector including the ferrule in this embodiment is inserted into or removed from a fiber connector including another ferrule, there is no need to rebel against an elastic force of a spring, and an insertion/removal force is relatively small. In a process in which the fiber connectors abut, wearing of connection end faces of ferrule bodies of the two fiber connectors is relatively small, prolonging a service life of the ferrule, in other words, prolonging a service life of the corresponding fiber connector. In addition, because an anti-static capability of the anti-reflection coating is superior to that of the ferrule body, setting the anti-reflection coating can further improve a dustproof capability of the fiber.

In a possible design, an anti-reflection coating is plated on a hole wall of the first section of through hole.

In this solution, the anti-reflection coating is plated on the hole wall of the first section of through hole. Therefore, a light wave reflected to the hole wall of the first section of through hole can be reflected to a fiber of a peer end, reducing light loss. In addition, if the anti-reflection coating is an inorganic compound, static electricity is not prone to occur, in other words, dust is not easily gathered, and a dustproof capability is improved. If the anti-reflection coating is an organic compound, an anti-static agent may be added to the organic compound, so that a dustproof capability of the first section of through hole is improved. In addition, if a component of the anti-reflection coating plated on the hole wall of the first section of through hole is an inorganic compound, because the anti-reflection coating of the inorganic compound has relatively high hardness, in a process in which a fiber connector including the ferrule abuts a fiber connector including another ferrule, a corresponding connection end face is not easily worn, improving insertion/removal reliability.

In a possible design, the at least one fiber is a fiber of an optical communications element body.

In this possible design, the fiber of the optical communications element body is directly used as the fiber of the ferrule, so that non-splicing between the fiber connector and an optical communications element is implemented, and an uncertain factor in optical transmission that is caused by splicing between the fiber connector and the optical communications element is avoided, ensuring optical transmission reliability.

In a possible design, after the ferrule abuts another ferrule, the anti-reflection coating is configured to suppress reflection of a communications light wave in a non-fiber transmission medium.

Because a light wave emitted from the fiber is a divergent light wave, a relatively large part of the light wave is reflected. When the anti-reflection coating whose refractive index falls between the refractive index of the air and the refractive index of the fiber is disposed on the end face of the first end of the fiber, when the light wave emitted from the fiber is transmitted in the non-fiber medium, a reflectivity of the light wave is reduced and a transmittance of the light wave is increased under an optical effect of the anti-reflection coating, and correspondingly, Fresnel reflection is also reduced, so that light loss is relatively small.

In a possible design, an area of a cross section of the first section of through hole in the direction vertical to the axial direction gradually increases from a bottom to the top of the first section of through hole, the bottom of the first section of through hole is a top of the second section of through hole, and the second section of through hole is a through hole other than the first section of through hole in the through hole.

In this solution, a fiber of a conventional MT ferrule can more easily enter the first section of through hole in the through hole of the fiber corresponding to the ferrule in this solution, and the first section of through hole of this shape may be produced, simplifying a technological process.

The hole wall of the first section of a through-hole may be a smooth curved surface, or may be in various other shapes, for example, a step-shaped curved surface.

In a possible design, a length of the first section of through hole is greater than or equal to the first preset distance.

In a possible design, there is a chamfer at an orifice of the first section of through hole.

The chamfer is disposed at the orifice of the first section of through hole. The chamfer is relatively smooth. Therefore, wearing of a ferrule body is relatively small when one ferrule is inserted into or removed from another ferrule. In addition, when a conventional MT ferrule abuts the ferrule in this embodiment, if a fiber of the conventional MT ferrule touches this area, the fiber can be prevented from being damaged. Because the chamfer is disposed at the orifice of the first section of through hole, a size of the orifice of the first section of through hole further increases, further reducing a probability that the fiber that is of the conventional MT ferrule and that protrudes from a ferrule body touches the connection end face of the ferrule body, and further ensuring fiber stability.

In a possible design, the first preset distance is greater than 1.8 μm.

A distance by which a fiber of a current conventional MT ferrule fiber connector protrudes from a connection end face is greater than or equal to 1.8 μm, and the first preset distance is greater than 1.8 μm, so that it can be ensured that there is a gap between the fiber of the ferrule in this solution and a fiber of another ferrule of any type when the ferrule abuts another ferrule.

Optionally, the first preset distance may fall between 1.8 μm and 3.7 μm, for example, is 2.5 μm or 3.5 μm.

In a possible design, the anti-reflection coating includes N layers of films, and N is a positive integer greater than or equal to 1.

When N is greater than or equal to 2, refractive indexes of two adjacent layers of films are different.

Optionally, N=2 or N=4.

The anti-reflection coating includes a plurality of layers, and refractive indexes of two adjacent layers of films are different, so that an anti-reflection capability of the anti-reflection coating can be improved.

In a possible design, a chemical component of each layer of film is an organic compound.

Optionally, the organic compound may be any one of the following: a fluorine-containing compound whose refractive index falls between the refractive index of the air and the refractive index of the fiber, an acrylic compound whose refractive index falls between the refractive index of the air and the refractive index of the fiber, and an epoxy compound whose refractive index falls between the refractive index of the air and the refractive index of the fiber.

For example, the organic compound is fluorinated acrylic acid, fluorinated epoxy, silicone fluorinated epoxy, fluorinated acrylic acid, chlorinated acrylic acid, fluorinated epoxy, or an epoxy complex.

The anti-reflection coating of the organic compound is produced at a room temperature.

In a possible design, a chemical component of each layer of film is an inorganic compound.

Optionally, the inorganic compound may be any one of the following: silicon oxide, tantalum oxide, molybdenum oxide, magnesium oxide, and the like.

Because the anti-reflection coating of the inorganic compound has relatively high hardness, in a process in which a fiber connector including the ferrule abuts a fiber connector including another ferrule, a corresponding connection end face is not easily worn, improving insertion/removal reliability, and prolonging service lives of the ferrule and the corresponding fiber connector.

In a possible design, a thickness of the anti-reflection coating is equal to ¼ of a wavelength of the communications light wave.

The thickness of the anti-reflection coating is equal to ¼ of the wavelength of the communications light wave, so as to minimize reflection, in the non-fiber transmission medium, of the light wave emitted from the fiber.

The ferrule in this aspect and various possible designs may be obtained based on the production method in this application (for example, various production methods in a seventh method, an eighth aspect, related implementations, and corresponding embodiments).

According to a second aspect, an embodiment of this application provides a fiber connector, including the ferrule described in any possible design of the first aspect.

When a light wave emitted from the fiber connector is transmitted in a non-fiber transmission medium, light loss is relatively small. When the fiber connector abuts another fiber connector, an insertion/removal force is small and insertion/removal reliability is high, and a precision requirement on a position of a through hole of a used ferrule body is low. In addition, a service life of the fiber connector is relatively long. In addition, the fiber connector has a relatively high dustproof capability.

According to a third aspect, an embodiment of this application provides an optical communications element, including an optical communications element body and at least one ferrule described in the first aspect, where the ferrule is connected to the optical communications element body.

A first implementation of connecting the ferrule to the optical communications element body is that a fiber of the ferrule and a fiber of the optical communications element body are spliced together. A second implementation of connecting the ferrule to the optical communications element body is that the ferrule is connected to the optical communications element body by sharing a fiber.

For the optical communications element corresponding to the second implementation of connecting the ferrule to the optical communications element body, because the ferrule is connected to the optical communications element body by sharing a fiber, non-splicing between the ferrule and the optical communications element is implemented, so that an uncertain factor in optical transmission that is caused by splicing between the ferrule and the optical communications element is avoided, ensuring optical transmission reliability.

According to a fourth aspect, an embodiment of this application provides an optical communications element, including an optical communications element body and the fiber connector described in the second aspect, where a ferrule of the fiber connector is connected to the optical communications element body.

According to a fifth aspect, an embodiment of this application provides a communications device, including a second optical communications element described in the fourth aspect and a first optical communications element, where the first optical communications element is connected to the second optical communications element by using respective fiber connectors.

According to a sixth aspect, an embodiment of this application provides a ferrule production method, including: obtaining a first ferrule body, where at least one first through hole is axially disposed inside the first ferrule body; obtaining a prefetched ferrule based on the first ferrule body and a first fiber, where one second fiber is inserted into each second through hole of a second ferrule body included in the prefetched ferrule, a vertical distance between an end face of a first end of the second fiber and a plane on which a connection end face of the second ferrule body is located is a first preset distance, and a first end of each second fiber is located inside a corresponding second through hole; and the second through hole includes a first section of through hole, an area of any cross section of the first section of through hole in a direction vertical to the axial direction is greater than an area of the end face of the first end of the second fiber, a plane on which a top of the first section of through hole is located is the plane on which the connection end face is located, and a projection of the fiber in the axial direction does not coincide with a projection of the any cross section of the first section of through hole in the direction vertical to the axial direction; and plating an anti-reflection coating on an outer wall of a fiber that is of the prefetched ferrule and that is located inside the first section of through hole, to obtain a ferrule, where the connection end face is an end face that is of the ferrule and that abuts another ferrule, and the first preset distance is a distance that can leave a gap between a fiber of the ferrule and a fiber of the another ferrule after the ferrule abuts the another ferrule.

A refractive index of the anti-reflection coating falls between a refractive index of air and a refractive index of the fiber.

According to the ferrule produced by using the foregoing method, because the anti-reflection coating is plated on the outer wall of the fiber that is of the prefetched ferrule and that is located inside the first section of through hole, a light wave emitted from the fiber has relatively small light loss in a non-fiber transmission process, and the ferrule has a relatively high dustproof capability. When the ferrule produced by using the foregoing method abuts another ferrule, an insertion/removal force is relatively small and insertion/removal reliability is high. In addition, a precision requirement on a position of the through hole of the used ferrule body is low, a service life of the obtained ferrule is relatively long, and a service life of a corresponding fiber connector is relatively long.

In a possible design, an area of a cross section of the first section of through hole in the direction vertical to the axial direction gradually increases from a bottom to the top of the first section of through hole.

In a possible design, a length of the first section of through hole is greater than or equal to the first preset distance.

In a possible design, there is a chamfer at an orifice of the first section of through hole.

A method for obtaining the first ferrule body in which the at least one first through hole is axially disposed includes the following three implementable embodiment manners.

In a first possible implementation, the obtained first ferrule body is a current conventional ferrule body, the first through hole of the first ferrule body does not have a first section of through hole, and the first section of through hole is any form of through hole described in any one of the foregoing ferrule embodiments. A first through hole of the conventional ferrule body also includes two sections referred to as a third section of through hole and a fourth section of through hole herein. A size of the third section of through hole is less than a size of the fourth section of through hole, the size of the third section of through hole matches a size of a part, off which a coating layer is stripped, of the first fiber, and the size of the fourth section of through hole matches a size of a part including the coating layer.

In an implementation, because the current conventional MT ferrule body is directly used, the ferrule body does not need to be reproduced, so that raw materials can be saved.

In a second possible implementation, the first ferrule body is produced through injection molding, the at least one first through hole is axially disposed inside the first ferrule body, and the first through hole includes the first section of through hole in any one of the foregoing designs.

In an implementation, the first ferrule body including the first section of through hole is directly obtained through injection molding, and there is no need to specially form the first section of through hole subsequently, so that the process is simple.

In a third possible implementation, the first ferrule body is produced through machining, the at least one first through hole is axially disposed inside the first ferrule body, and the first through hole includes the first section of through hole in any one of the foregoing designs.

In an implementation, the first ferrule body including the first section of through hole is directly obtained through precise machining, and there is no need to specially form the first section of through hole subsequently, so that the process is simple.

If the method for obtaining the first ferrule body in which the at least one first through hole is axially disposed is the foregoing first implementation, the obtaining a prefetched ferrule based on the first ferrule body and a first fiber includes: inserting the first fiber into each first through hole, so that an end face that is of an end of the first fiber and that includes no coating layer protrudes from the connection end face; and removing a part that is of the first fiber and that protrudes from the connection end face, and removing, starting from a part that is of the first fiber and that is flush with the connection end face, a first fiber whose length is the first preset distance through grinding by using a grinding machine provided with an etching solution, to obtain the prefetched ferrule including the first section of through hole, where a first end of the first through hole is an end close to the connection end face, the second fiber is a first fiber obtained after the grinding, the second through hole is a first through hole obtained after the grinding, and the second ferrule body is a ferrule body including the second through hole.

Optionally, the etching solution in the foregoing method is a solution of a lanthanide alkaline earth compound or a solution of a silicate mineral salt.

In the method, because the grinding machine is provided with the solution of the lanthanide alkaline earth compound or the solution of the silicate mineral salt, the first fiber of the first preset distance may be removed through grinding. When the first fiber whose length is the first preset distance is removed through grinding by using the grinding machine provided with the etching solution, the first end of the first through hole is also ground, so that the first section of through hole can be obtained. Because the etching solution has a polishing effect on a hole wall of the through hole touched by the etching solution, there may be a chamfer at the orifice of the first section of through hole.

Optionally, after the first fiber whose length is the first preset distance is removed through grinding by using the grinding machine provided with the solution of the lanthanide alkaline earth compound or the solution of the silicate mineral salt, the first end of the first through hole may be further ground by using the grinding machine, so that a size of the obtained first section of through hole is larger.

The size of the first section of through hole is larger, so that a probability of touching a ferrule body can be further reduced when a fiber of a conventional MT ferrule abuts the ferrule produced by using the method in this solution, better ensuring optical transmission stability.

If the method for obtaining the ferrule body in which the at least one through hole is axially disposed is the foregoing second implementation or the foregoing third implementation, the obtaining a prefetched ferrule based on the first ferrule body and a first fiber includes: inserting the first fiber into each first through hole, so that an end face of a first end of the first fiber protrudes from the connection end face by a second preset distance; pressing, by using a fiber stop tooling, the end face of the first end of the first fiber into the first section of through hole; and removing the fiber stop tooling to obtain the prefetched ferrule, where the second fiber is the first fiber, the first through hole is the second through hole, and the second ferrule body is the first ferrule body.

The technological process is simple in the method.

In a possible design, the anti-reflection coating includes N layers of films, and N is a positive integer greater than or equal to 1.

When N is greater than or equal to 2, refractive indexes of two adjacent layers of films are different.

The anti-reflection coating includes a plurality of layers, and refractive indexes of two adjacent layers of films are different, so that an anti-reflection capability of the anti-reflection coating can be improved.

The plating an anti-reflection coating on an outer wall of a fiber that is of the prefetched ferrule and that is located inside the first section of through hole may include the following five implementations.

In a first implementation, the anti-reflection coating is plated, by using a spin coating technique, on the outer wall of the fiber that is of the prefetched ferrule and that is located inside the first section of through hole.

Optionally, when surface tension of a compound solution that forms the anti-reflection coating is less than preset tension, the anti-reflection coating is plated, by using the spin coating technique, on the outer wall of the fiber that is of the prefetched ferrule and that is located inside the first section of through hole.

In a possible implementation, the process may be implemented. Because of a normal temperature in this implementation, a fiber of an optical communications element body may be directly used as the fiber inserted into the ferrule, so that non-splicing between an optical communications element and a fiber connector can be implemented.

In a second implementation, the anti-reflection coating is plated, by using a spot coating technique, on the outer wall of the fiber that is of the prefetched ferrule and that is located inside the first section of through hole.

When surface tension of a compound solution that forms the anti-reflection coating is greater than preset tension, the anti-reflection coating is plated, by using the spot coating technique, on the outer wall of the fiber that is of the prefetched ferrule and that is located inside the first section of through hole.

In a possible implementation, the process may be implemented. Because of a normal temperature in this implementation, a fiber of an optical communications element body may be directly used as the fiber inserted into the ferrule, so that non-splicing between an optical communications element and a fiber connector can be implemented.

In a third implementation, the anti-reflection coating is plated, by using a nanometer embossing technique, on the outer wall of the fiber that is of the prefetched ferrule and that is located inside the first section of through hole.

Optionally, when N=1, that the anti-reflection coating is plated, by using the nanometer embossing technique, on the outer wall of the fiber that is of the prefetched ferrule and that is located inside the first section of through hole includes: coating, on the outer wall of the fiber located inside the first section of through hole, a polymer solution that forms the anti-reflection coating, and pressing the polymer solution by using a nanomold, so that the polymer solution is filled in a mold cavity of the nanomold; curing a polymer in the polymer solution through crosslinking by using a crosslinking technique, to obtain the anti-reflection coating; and performing photolithography etching on a target area, so that no anti-reflection coating exists in the target area, where the target area is an area in the ferrule body except the hole wall of the first section of through hole and the outer wall of the fiber located inside the first section of through hole.

Optionally, when N=2, that the anti-reflection coating is plated, by using the nanometer embossing technique, on the outer wall of the fiber that is of the prefetched ferrule and that is located inside the first section of through hole includes: coating, on the outer wall of the fiber located inside the first section of through hole, a first polymer solution that forms the anti-reflection coating, and pressing the first polymer solution by using a nanomold, so that the first polymer solution is filled in a mold cavity of the nanomold; curing a first polymer in the first polymer solution through crosslinking by using a crosslinking technique, to obtain a first layer of film of the anti-reflection coating; performing photolithography etching on a target area, so that no anti-reflection coating exists in the target area, where the target area is an area in the ferrule body except the hole wall of the first section of through hole and the outer wall of the fiber located inside the first section of through hole; coating, on the first layer of film of the anti-reflection coating, a second polymer solution that forms the anti-reflection coating, and pressing the second polymer solution by using a nanomold, so that the second polymer solution is filled in a mold cavity of the nanomold; curing a second polymer in the second polymer solution through crosslinking by using the crosslinking technique, to obtain the anti-reflection coating; and performing photolithography etching on the target area, so that no anti-reflection coating exists in the target area.

Optionally, the crosslinking technique may be light irradiation or thermal crosslinking.

In a possible implementation, a high-quality anti-reflection coating may be obtained. In addition, even if the crosslinking technique is thermal crosslinking, because a communications element does not need to be placed in a high temperature in this implementation, and a high temperature is applied only to an area that needs to be plated with a reflection coating, non-splicing between an optical communications element and a fiber connector can be implemented.

In a fourth possible implementation, the anti-reflection coating is plated, by using a technique of ion sputtering plating with assistance of vacuum evaporation plating, on the outer wall of the fiber that is of the prefetched ferrule and that is located inside the first section of through hole. A vacuum degree of the technique of ion sputtering plating with assistance of vacuum evaporation plating falls within a first preset range, an evaporation rate falls within a second preset range, a furnace body temperature is a preset temperature, and a target source is a target source whose purity is greater than or equal to preset purity, so that after a coating-forming substance reaches the end face of the first end of the fiber and the hole wall of the first section of through hole, a target temperature of the coating-forming substance is less than a maximum temperature at which a corresponding optical communications element can work normally. The first preset range is $2\times10^{-5}$-$6\times10^{-5}$ millibars (mbar), the second preset range is 0.1-1.5 nm/s, the preset temperature is a room temperature, the preset purity is 99.99 percent (%), and the target temperature is 65-75 degrees Celsius (° C.).

This possible implementation may be implemented industrially. In addition, this possible implementation is applicable to directly producing a ferrule on an optical communications element that can tolerate a specific temperature, in other words, non-splicing between the optical communications element and a fiber connector can be implemented.

In a fifth possible implementation, the anti-reflection coating is plated, by using a current conventional technique of ion sputtering plating with assistance of vacuum evaporation plating, on the outer wall of the fiber that is of the prefetched ferrule and that is located inside the first section of through hole.

This possible implementation may be implemented industrially, but is not applicable to directly producing a ferrule on an optical communications element.

In a possible design, a chemical component of the anti-reflection coating is an organic compound.

Optionally, the organic compound may be any one of the following: a fluorine-containing compound whose refractive index falls between the refractive index of the air and the refractive index of the fiber, an acrylic compound whose refractive index falls between the refractive index of the air and the refractive index of the fiber, and an epoxy compound whose refractive index falls between the refractive index of the air and the refractive index of the fiber.

For example, the organic compound is fluorinated acrylic acid, fluorinated epoxy, silicone fluorinated epoxy, fluorinated acrylic acid, chlorinated acrylic acid, fluorinated epoxy, or an epoxy complex.

A process of producing the anti-reflection coating of the organic compound is simple.

The first three implementations of plating the anti-reflection coating on the outer wall of the fiber that is of the prefetched ferrule and that is located inside the first section of through hole are applicable to a case in which a chemical component of the anti-reflection coating is an organic compound.

In a possible design, a chemical component of each layer of film is an inorganic compound.

Optionally, the inorganic compound may be any one of the following: silicon oxide, tantalum oxide, molybdenum oxide, and magnesium oxide.

Because the anti-reflection coating of the inorganic compound has relatively high hardness, in a process in which a fiber connector including the ferrule abuts a fiber connector including another ferrule, a corresponding connection end face is not easily worn, prolonging a service life. In addition, an anti-static capability of the inorganic compound is high, so that a dustproof capability of the fiber can be improved.

The last two implementations of plating the anti-reflection coating on the outer wall of the fiber that is of the prefetched ferrule and that is located inside the first section of through hole are applicable to a case in which a chemical component of the anti-reflection coating is an inorganic compound.

In a possible design, the fiber is in an optical communications element body.

In this possible design, the fiber of the optical communications element body is directly used as the fiber of the ferrule, so that non-splicing between a fiber connector and an optical communications element is implemented, and an uncertain factor in optical transmission that is caused by splicing between the fiber connector and the optical communications element is avoided, ensuring optical transmission reliability.

In a possible design, an anti-reflection coating is plated on a hole wall of each first section of through hole.

According to a seventh aspect, an embodiment of this application provides a ferrule production method, including: obtaining a first ferrule body, where the first ferrule body includes a first through hole; inserting the first fiber into each first through hole, so that an end face that is of an end of the first fiber and that includes no coating layer protrudes from the connection end face; removing a part that is of the first fiber and that protrudes from the connection end face, and removing, starting from a part that is of the first fiber and that is flush with the connection end face, a first fiber whose length is the first preset distance through grinding by using a grinding machine provided with a solution of a lanthanide alkaline earth compound or a solution of a silicate mineral salt, to obtain a prefetched ferrule including a first section of through hole, where a first fiber obtained after the grinding by using the grinding machine is a fiber of the prefetched ferrule, and a first ferrule body obtained after the grinding by using the grinding machine is a ferrule body of the prefetched ferrule, and a first end of the first through hole is an end close to the connection end face, where a plane on which a top of the first section of through hole is located is a plane on which a connection end face of the ferrule body of the prefetched ferrule is located, an area of any cross section of the first section of through hole in a direction vertical to an axial direction of the ferrule body of the prefetched ferrule is greater than an area of an end face of a first end of the fiber of the prefetched ferrule, and a projection of the fiber in the axial direction does not coincide with a projection of the any cross section of the first section of through hole in the direction vertical to the axial direction of the ferrule body of the prefetched ferrule; and plating an anti-reflection coating on an outer wall of the fiber that is of the prefetched ferrule and that is located inside the first section of through hole, to obtain a ferrule, where the connection end face is an end face that is of the ferrule and that abuts another ferrule, and the first preset distance is a distance that can leave a gap between a fiber of the ferrule and a fiber of the another ferrule after the ferrule abuts the another ferrule.

Optionally, after the first fiber whose length is the first preset distance is removed through grinding by using the grinding machine provided with the solution of the lanthanide alkaline earth compound or the solution of the silicate mineral salt, the first end of the first through hole may be further ground by using the grinding machine, so that a size of the obtained first section of through hole is larger.

According to an eighth aspect, an embodiment of this application provides a fiber connector, including at least one ferrule produced based on the method described in any possible design of the sixth aspect or the method described in the seventh aspect.

According to a ninth aspect, an embodiment of this application provides a communications element, including an optical communications element body and at least one ferrule produced based on the method described in any possible design of the sixth aspect or the method described in the seventh aspect, where the ferrule is connected to the optical communications element body.

According to a tenth aspect, an embodiment of this application provides a communications element, including an optical communications element body and at least one fiber connector described in the eighth aspect, where a ferrule of the fiber connector is connected to the optical communications element body.

According to an eleventh aspect, an embodiment of this application provides a communications device, including a second optical communications element described in the tenth aspect and a first optical communications element, where the first optical communications element is connected to the second optical communications element by using respective fiber connectors.

The ferrule in this application includes a ferrule body and at least one fiber. At least one through hole is axially disposed inside the ferrule body, each fiber is inserted into a corresponding through hole, a first end of the fiber is located inside the through hole, and a vertical distance between an end face of the first end of the fiber and a plane on which a connection end face of the ferrule body is located is a first preset distance. The connection end face is an end face that is of the ferrule and that abuts another ferrule, and the first preset distance is a distance that can leave a gap between a fiber of the ferrule and a fiber of the another ferrule after the ferrule abuts the another ferrule. The through hole includes a first section of through hole, a plane on which a top of the first section of through hole is located is the plane on which the connection end face of the ferrule body is located, an area of any cross section of the first section of through hole in a direction vertical to an axial direction is greater than an area of the end face of the first end of the fiber, and a projection of the fiber in the axial direction does not coincide with a projection of the any cross section of the first section of through hole in the direction vertical to the axial direction of the ferrule body. An anti-reflection coating is plated on an outer wall of the fiber located inside the first section of through hole. According to the ferrule in this application, through setting of the anti-reflection coating, during use, transmission loss of light is relatively small and a dustproof capability of the ferrule is relatively high. In addition, when a fiber connector including the ferrule in the embodiments is inserted into or removed from a fiber connector including another ferrule, an insertion/removal force is relatively small and insertion/removal reliability is high, prolonging a service life of the fiber connector. In addition, a precision requirement on a position of the through hole of the ferrule body is low, and ferrule production costs are reduced.

According to a twelfth aspect, an embodiment of this application discloses a fiber grinding method, namely, a grinding method in the ferrule production method provided in the sixth aspect and various implementations of the sixth aspect, and the grinding method is not only applicable to producing the ferrule in this application, but also applicable to high-precision fiber grinding in another field.

Figure 1:
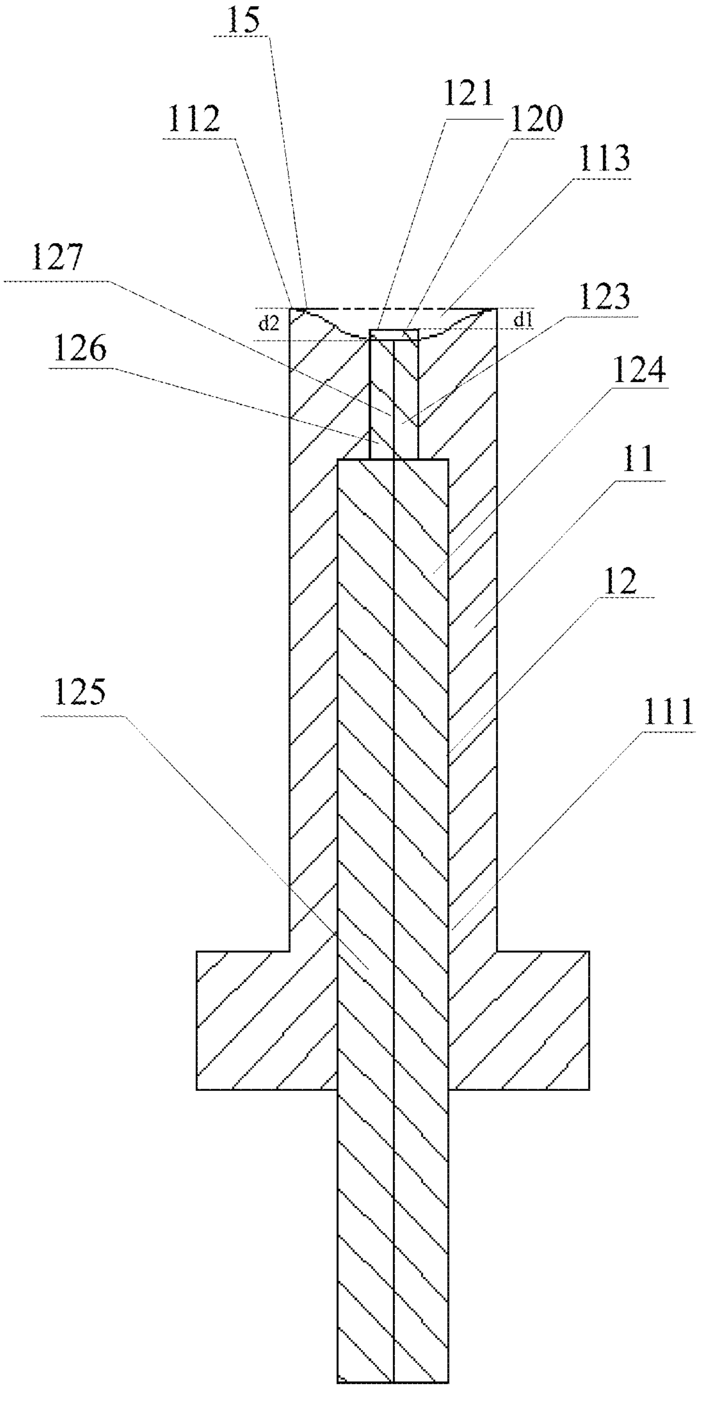
FIG. 1 is a schematic cross-sectional diagram 1 of a ferrule according to an embodiment of this application.

| Explanation of reference numerals: |
|---|
| 11: Ferrule body; |
| 111: Through hole; |
| 12: Fiber; |
| 112: Connection end face of the ferrule body; |
| 121: End face of a first end of the fiber; |
| 123: First part; |
| 124: Second part; |
| 125: Coating layer; |
| 126: Cladding layer; |
| 127: Core layer; |
| 113: First section of through hole; |
| 114: Second section of through hole; |
| 13: Bottom of the first section of through hole; |
| 14: Top of the first section of through hole; |
| 200: Housing; |
| 10: Fiber connector; |
| 21: Optical backplane; |
| 22: Board; |
| 33: Gap; |
| 15: Chamfer; |
| 120: First end of the fiber. |

DESCRIPTION OF EMBODIMENTS

In the descriptions of this application, it should be understood that directions or position relationships indicated by the terms “up”, “down”, “front”, “rear”, “vertical”, “horizontal”, “top”, “bottom”, “inside”, “outside”, and the like are based on the directions or position relationships shown in the accompanying drawings, and are merely intended to describe this application and simplify the descriptions, but are not intended to indicate or imply that an apparatus or an element shall have a specific direction or be formed and operated in a specific direction, and therefore shall not be understood as a limitation on this application. In the descriptions of this application, “a plurality of” means two or more, unless otherwise specified.

Embodiment 1

Figure 2:
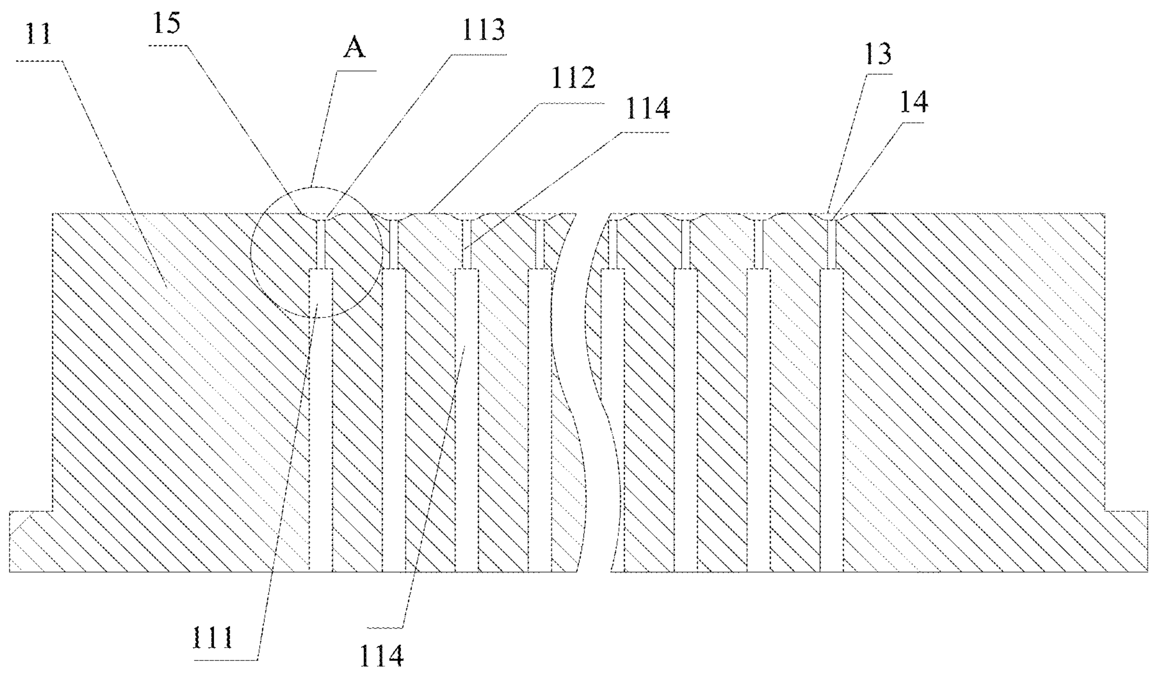
FIG. 2 is a schematic cross-sectional diagram of a ferrule body according to an embodiment of this application.
Figure 3:
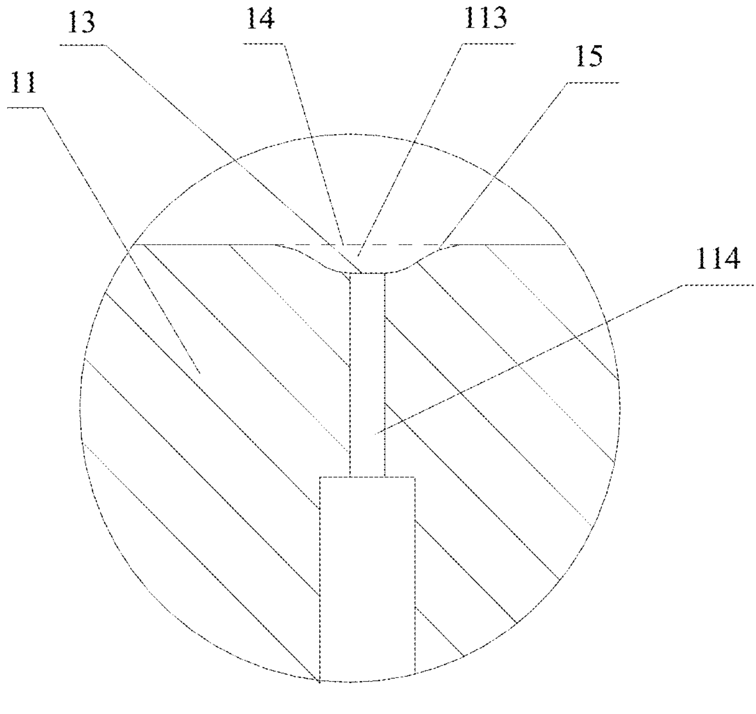
FIG. 3 is a magnification diagram of a part of ferrule body in FIG. 2.
Figure 4:
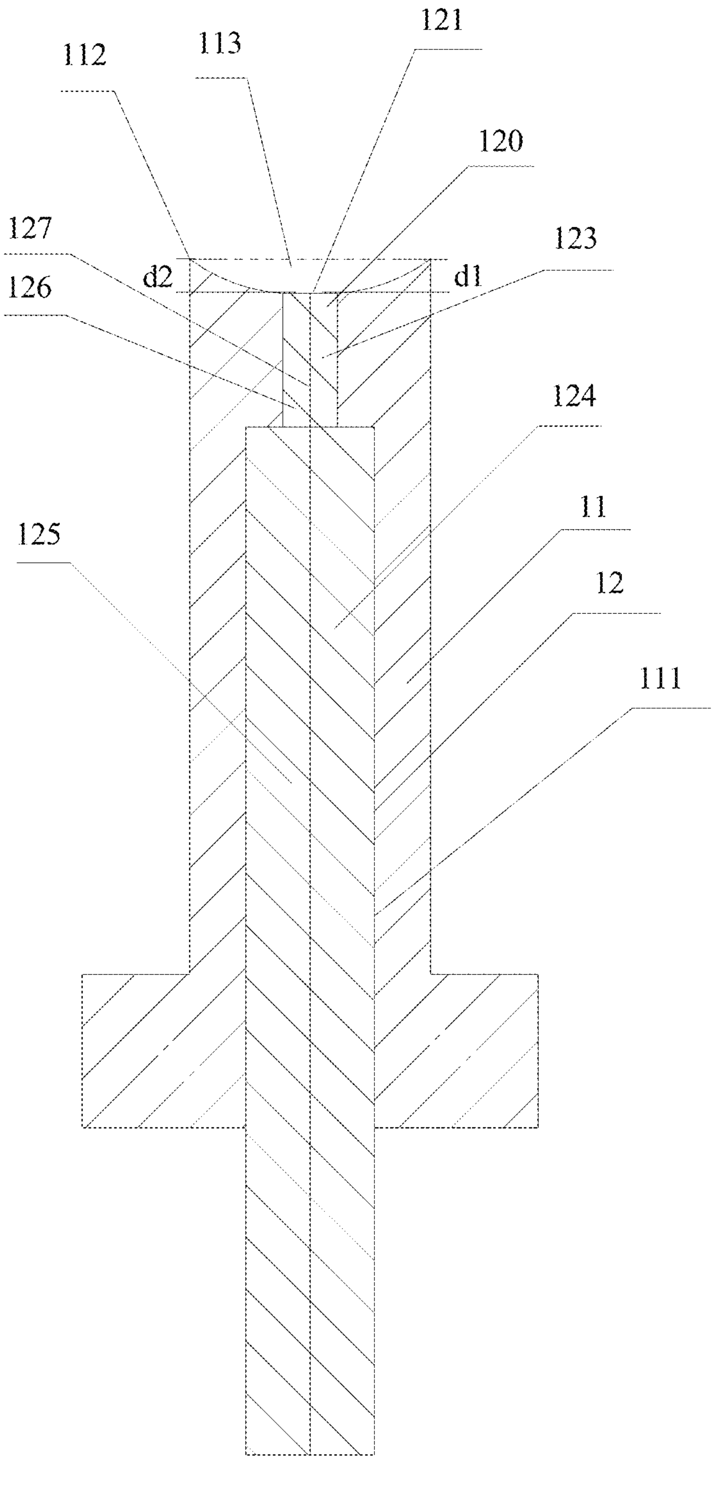
FIG. 4 is a schematic cross-sectional diagram of a ferrule according to an embodiment of this application.
Figure 5:
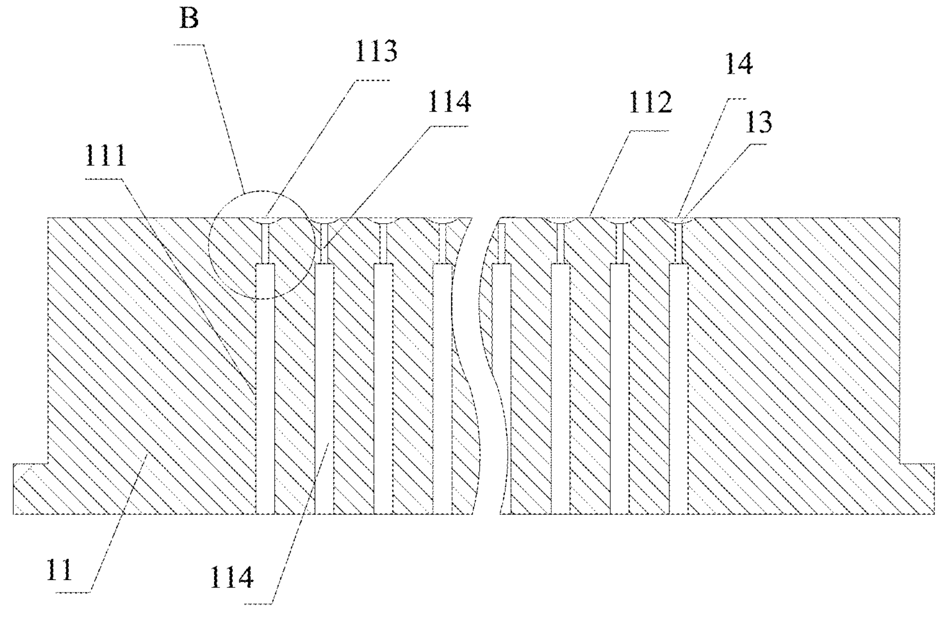
FIG. 5 is a schematic cross-sectional diagram of a ferrule body according to an embodiment of this application.
Figure 6:
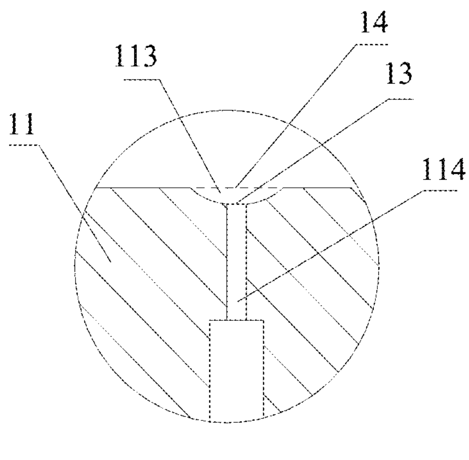
FIG. 6 is a magnification diagram of a part of ferrule body in FIG. 5.

FIG. 1 is a schematic local cross-sectional diagram 1 of a ferrule according to an embodiment of this application. FIG. 2 is a schematic cross-sectional diagram 1 of a ferrule body according to an embodiment of this application. FIG. 3 is a local magnification diagram of a part A in FIG. 2. FIG. 4 is a schematic local cross-sectional diagram 2 of a ferrule according to an embodiment of this application. FIG. 5 is a schematic cross-sectional diagram 2 of a ferrule body according to an embodiment of this application. FIG. 6 is a local magnification diagram of a part B in FIG. 5.

Referring to FIG. 1 to FIG. 6, in this embodiment of this application, at least one through hole 111 is axially disposed inside a ferrule body 11, each fiber 12 is inserted into a corresponding through hole 111, a first end 120 of the fiber 12 is located inside the through hole 111, a vertical distance between an end face 121 of the first end 120 of the fiber and a plane on which a connection end face 112 of the ferrule body 11 is located is a first preset distance d1, and the connection end face 112 of the ferrule body 11 is an end face that is of a ferrule 100 and that abuts another ferrule; and the first preset distance is a distance that can leave a gap between the fiber of the ferrule 100 and a fiber of the another ferrule after the ferrule 100 abuts the another ferrule. It may be understood that the “end” in this embodiment refers to a solid structure with a specific length, a specific width, and a specific height.

The ferrule 100 includes the ferrule body 11 and the fiber 12. The ferrule body 11 is a component for fastening a fiber, and is usually implemented by using a material such as ceramic or plastic. The fiber 12 includes a first part 123 and a second part 124 in an axial direction. A size of the second part 124 is greater than a size of the first part 123, and the second part successively includes a coating layer 125, a cladding layer 126, and a core layer 127 from outside to inside in a radial direction. If the second part is cylindrical, a diameter of the second part may be 250 μm. The first part 123 is a bare fiber, and the first part 123 successively includes a cladding layer and a core layer from outside to inside in the radial direction. In other words, the first part does not include a coating layer, and the coating layer is stripped off. If the first part is cylindrical, a diameter of the first part may be 125 μm. The core layer is a truly luminous part, and a diameter of the core layer may be 9 μm. The structure of the fiber belongs to other approaches, and an implementation (for example, a material and a size) of each part belongs to other approaches. Details are not described in this application.

The at least one through hole 111 is axially disposed inside the ferrule body 11, and a quantity of through holes 111 inside the ferrule body 11 is determined based on an actual requirement. For example, there may be 12 through holes, and correspondingly, the 12 through holes are in a one-to-one correspondence with 12 fibers. In other words, one fiber is inserted into each through hole.

Each fiber 12 is inserted into a corresponding through hole 111, a first end 120 of the fiber 12 is located inside the through hole 111, and a vertical distance between an end face 121 of the first end 120 of the fiber 12 and the plane on which the connection end face 112 of the ferrule body 11 is located is the first preset distance.

In an example, each through hole 111 of the ferrule body 11 includes a first section of through hole 113 and a second section of through hole 114, and the second section of through hole 114 is a through hole other than the first section of through hole 113 in the through hole 111.

A plane on which a top 14 of the first section of through hole 113 is located is the plane on which the connection end face 112 of the ferrule body 11 is located, and an area of any cross section of the first section of through hole 113 in a direction vertical to an axial direction of the ferrule body 11 is greater than an area of the end face 121 of the first end 120 of the fiber 12. A projection of the fiber 12 in the axial direction does not coincide with a projection of the any cross section of the first section of through hole 113 in the direction vertical to the axial direction of the ferrule body 11. In other words, the fiber does not touch the ferrule body if the fiber extends from the first end in the axial direction of the fiber.

A person skilled in the art may understand that, with reference to the accompanying drawings, the projection of the any cross section of the first section of through hole 113 in the direction vertical to the axial direction of the ferrule body 11 is in a substantially ring-like shape. In other words, a part in the middle is hollow (the part of space is occupied by the fiber).

A shape of the second section of through hole 114 may match a shape of the fiber, and is usually cylindrical. For example, the second section of through hole 114 has a part that matches the first part 123 of the fiber 12 and a part that matches the second part 124 of the fiber 12. Because the size of the first part 123 of the fiber 12 is different from the size of the second part 124, the second section of through hole 114 may be a step-shaped through hole.

In this embodiment, the area of the any cross section of the first section of through hole in the direction vertical to the axial direction of the ferrule body is greater than the area of the end face of the first end of the fiber, and the projection of the fiber 12 in the axial direction does not coincide with the projection of the any cross section of the first section of through hole 113 in the direction vertical to the axial direction of the ferrule body 11. In other words, a size of a through hole close to the connection end face of the ferrule body is greater than the size of the first part of the fiber, and the fiber does not touch the body if the fiber extends from the first end in the axial direction of the fiber. In this case, when a fiber of a conventional MT ferrule abuts the ferrule in this embodiment, there is a low possibility that the fiber that is of the conventional MT ferrule and that protrudes from a ferrule body touches the connection end face of the ferrule body. Therefore, wearing of the fiber that is of the conventional MT ferrule and that protrudes from the ferrule body is reduced, and fiber stability is ensured. In other words, insertion/removal reliability between another ferrule and the ferrule in this embodiment is improved. In addition, a precision requirement on a position of the through hole of the used ferrule body is reduced, and ferrule production costs are reduced.

In this embodiment of this application, an anti-reflection coating is plated on an outer wall of the fiber 12 located inside the first section of through hole 113.

Optionally, an anti-reflection coating is also plated on a hole wall of the first section of through hole 113.

In an example, the anti-reflection coating includes N layers of films, and N is a positive integer greater than or equal to 1. When N is greater than or equal to 2, refractive indexes of two adjacent layers of films are different.

If a bottom of the first section of through hole 113 (namely, a top of the second section of through hole 114, or an end face of an end that is of the second section 114 and that is closer to the connection end face 112) is flush with the end face 121 of the first end 120 of the fiber 12, the outer wall of the fiber 12 located inside the first section of through hole 113 is the end face 121 of the first end 120 of the fiber 12. In this case, an anti-reflection coating is plated on the end face 121 of the first end 120 of the fiber 12. If a part of the fiber 12 exists in the first section of through hole 113, an anti-reflection coating is plated on all of the outer wall (including the end face 121 and another part that protrudes from the body) of the fiber 12 located inside the first section of through hole 113. Referring to FIG. 1, a person skilled in the art may understand that, if a part of fiber exists in the first section of through hole, a length of the fiber inside the first section of through hole should be very short, and is usually less than 1 μm. For example, the length is 0.3 μm or 0.5 μm.

The anti-reflection coating is plated on the outer wall of the fiber located inside the first section of through hole 113. Therefore, reflection of light emitted from the fiber can be reduced, so that light loss can be reduced. In addition, the fiber does not easily gather dust, in other words, a dustproof capability of the fiber is improved. If the anti-reflection coating is an inorganic compound, static electricity is not prone to occur, in other words, dust is not easily gathered, and a dustproof capability is improved. If the anti-reflection coating is an organic compound, an anti-static agent may be added to the organic compound, so that a dustproof capability of the fiber is improved.

The anti-reflection coating is plated on the hole wall of the first section of through hole 113. Therefore, a light wave reflected to the hole wall of the first section of through hole 113 can be reflected to a fiber of a peer end, reducing light loss. In addition, if the anti-reflection coating is an inorganic compound, static electricity is not prone to occur, in other words, dust is not easily gathered, and a dustproof capability is improved. If the anti-reflection coating is an organic compound, an anti-static agent may be added to the organic compound, so that a dustproof capability of the first section of through hole is improved. In addition, if a component of the anti-reflection coating plated on the hole wall of the first section of through hole 113 is an inorganic compound, because the anti-reflection coating of the inorganic compound has relatively high hardness, in a process in which a fiber connector including the ferrule abuts a fiber connector including another ferrule, a corresponding connection end face is not easily worn, improving insertion/removal reliability.

In addition, the at least one ferrule 100 may form a fiber connector, and an implementation is described in a subsequent embodiment.

It should be noted that a size of the first section of through hole in FIG. 1 to FIG. 6 is relatively large, so as to better illustrate the first section of through hole, and an actual size of the first section of through hole may be slightly greater than the size of the first part of the fiber 12.

In this embodiment, because the anti-reflection coating is plated on each of the outer wall of the fiber located inside the first section of through hole and the hole wall of the first section of through hole, transmission loss of light in a transmission process can be greatly reduced. Therefore, after the ferrule in this embodiment abuts another ferrule, transmission loss of light is reduced without requiring fibers corresponding to the two ferrules to be in contact. In other approaches, a spring is disposed on a ferrule, so that each pair of corresponding fibers of two abutting ferrules can be in contact by using an elastic force of the spring. By comparison, when a fiber connector including the ferrule in this embodiment is inserted into or removed from a fiber connector including another ferrule, there is no need to rebel against an elastic force of a spring, and an insertion/removal force is relatively small. In a process in which the fiber connectors abut, wearing of connection end faces of ferrule bodies of the two fiber connectors is relatively small, prolonging a service life of the ferrule, in other words, prolonging a service life of the corresponding fiber connector.

Embodiment 2

Based on the foregoing embodiment, setting of the first preset distance in Embodiment 1 is described in detail in this embodiment.

The first preset distance in this embodiment is a distance that can leave a gap between the fiber of the ferrule 100 and a fiber of another ferrule after the ferrule 100 abuts another ferrule. In other words, after a fiber connector including the ferrule 100 in this embodiment is connected to a fiber connector including another ferrule, there is a gap between a fiber of the fiber connector including the ferrule 100 in this embodiment and a fiber corresponding to the fiber connector including the another ferrule.

The first preset distance may be determined based on a distance by which a fiber of a current conventional MT ferrule fiber connector protrudes from a connection end face of a ferrule body (or a distance by which a fiber of a conventional MT ferrule protrudes from a connection end face of a ferrule body, where the distance is referred to as a "protrusion distance of the conventional MT ferrule"). The first preset distance may be greater than the protrusion distance of the conventional MT ferrule. For example, the protrusion distance of the current conventional MT ferrule is usually 1.8 μm. Correspondingly, the first preset distance needs to be greater than 1.8 μm, for example, may be 2.5 μm, 2.8 μm, 3 μm, or 3.5 μm. On a premise that the first preset distance is greater than the protrusion distance of the conventional MT ferrule, if the first preset distance is closer to the protrusion distance of the conventional MT ferrule, less transmission loss of light is caused, a signal loss probability is lower, and a transmission effect is better. However, in practice, because of a limitation of a technical level, an error may exist in terms of precision, and the first preset distance cannot approach the protrusion distance of the conventional MT ferrule without a limitation. Therefore, a person skilled in the art may determine an actual first preset distance based on an actual technical level.

Figure 7:
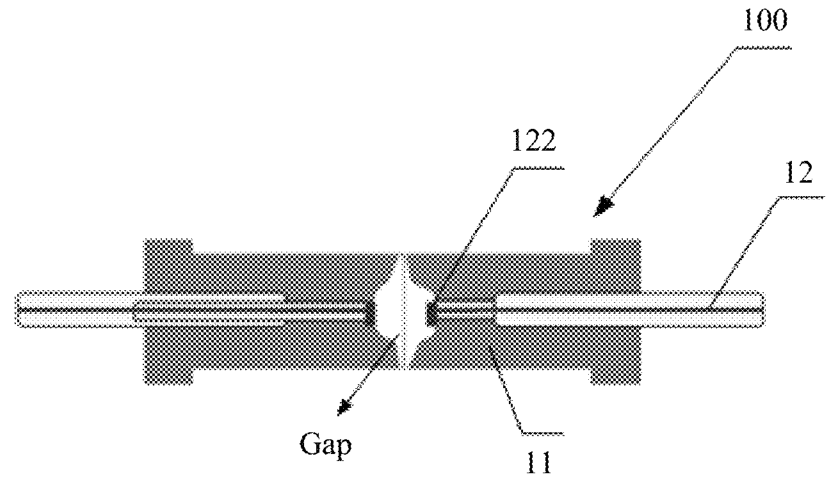
FIG. 7 is a schematic diagram of an abutting state between ferrules according to an embodiment of this application.
Figure 8:
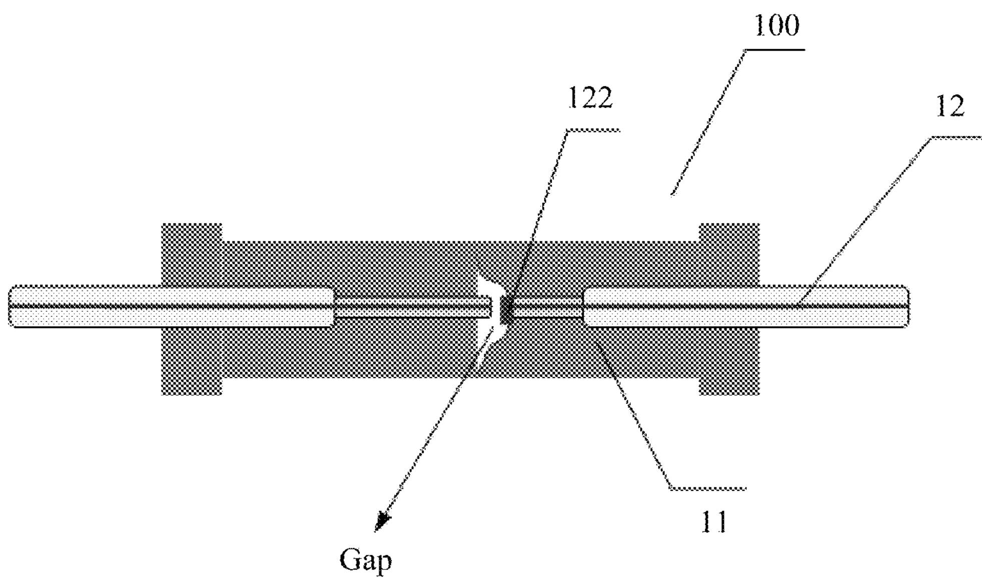
FIG. 8 is a schematic diagram of an abutting state between ferrules according to an embodiment of this application.
Figure 9:
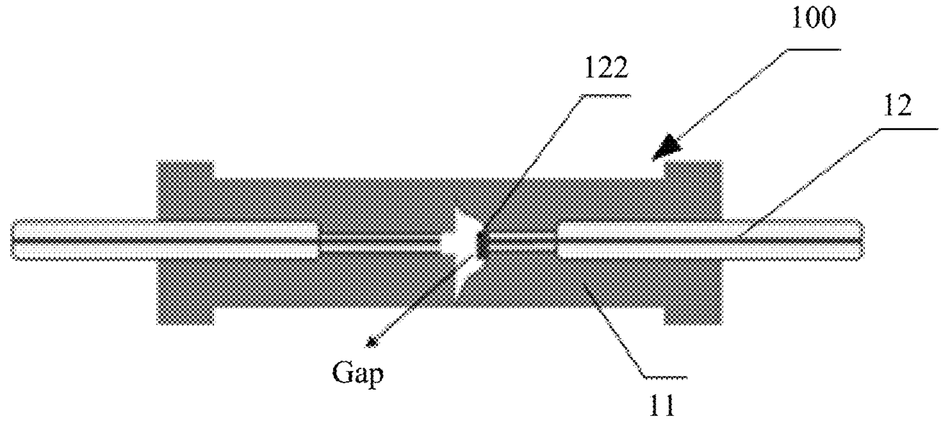
FIG. 9 is a schematic diagram of an abutting state between ferrules according to an embodiment of this application.
Figure 10:
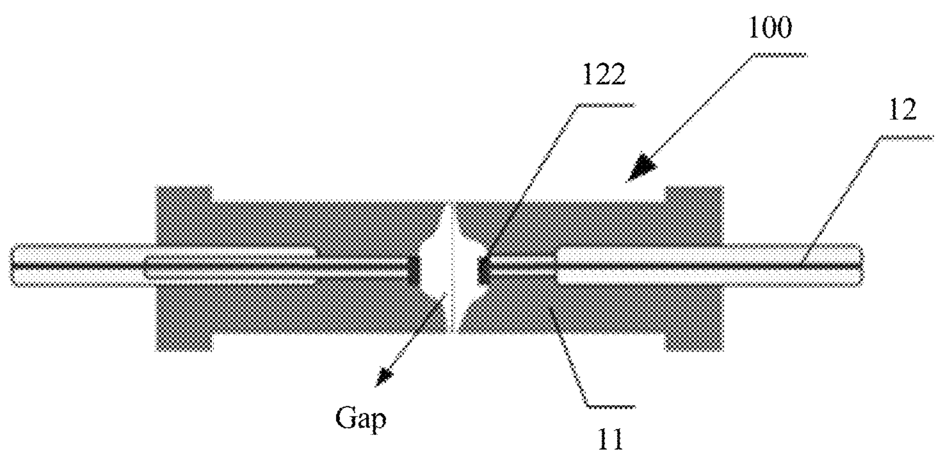
FIG. 10 is a schematic diagram of an abutting state between ferrules according to an embodiment of this application.

FIG. 7 to FIG. 10 are schematic diagrams of an abutting state between the ferrule in this embodiment and another ferrule. FIG. 7 is a schematic diagram 1 of an abutting state between ferrules according to an embodiment of this application. FIG. 8 is a schematic diagram 2 of an abutting state between ferrules according to an embodiment of this application. FIG. 9 is a schematic diagram 3 of an abutting state between ferrules according to an embodiment of this application. FIG. 10 is a schematic diagram 4 of an abutting state between ferrules according to an embodiment of this application.

Referring to FIG. 7, an end face of a fiber that is inserted into a ferrule body of another ferrule in FIG. 7 is flush with a connection end face of the ferrule body. After the ferrule 100 in this embodiment abuts the another ferrule, there is a gap between fibers corresponding to the two ferrules.

Referring to FIG. 8, an end face of a fiber that is inserted into a ferrule body of another ferrule in FIG. 8 protrudes from a connection end face of the ferrule body by a distance. The protrusion distance is less than the first preset distance. After the ferrule 100 in this embodiment abuts the another ferrule, there is a gap between fibers corresponding to the two ferrules.

A person skilled in the art may understand that, after the two ferrules in FIG. 8 abut, a gap between the fibers corresponding to the two ferrules is very small (for example, approximately 1 μm). In FIG. 8, to illustrate that after the two ferrules abut, there is a gap between the fibers corresponding to the two ferrules, the gap is magnified.

Referring to FIG. 9, an end face of a fiber that is inserted into a ferrule body of another ferrule in FIG. 9 is located inside a through hole. Apparently, after the ferrule 100 in this embodiment abuts the other ferrule, there is a gap between fibers corresponding to the two ferrules.

Referring to FIG. 10, another ferrule in FIG. 10 is the ferrule 100 in this embodiment. Apparently, after two ferrules 100 in this embodiment abut, there is a gap between fibers corresponding to the two ferrules.

It can be learned from FIG. 5 to FIG. 8 that, after the ferrule 100 in this embodiment abuts another ferrule of any type, there is a gap between fibers corresponding to the two ferrules.

Embodiment 3

Based on the foregoing embodiments, setting of the first section of through hole 113 of the ferrule 100 in the foregoing embodiments is described in detail in this embodiment.

In this embodiment, the area of the any cross section of the first section of through hole 113 in the direction vertical to the axial direction of the ferrule body is greater than the area of the end face 121 of the first end 120 of the fiber 12, and the projection of the fiber 12 in the axial direction does not coincide with the projection of the any cross section of the first section of through hole 113 in the direction vertical to the axial direction of the ferrule body 11.

In an example, a shape of the first section of through hole 113 may be regular or irregular, provided that the area of the any cross section of the first section of through hole 113 in the direction vertical to the axial direction of the ferrule body is greater than the area of the end face 121 of the first end 120 of the fiber 12, and the projection of the fiber 12 in the axial direction does not coincide with the projection of the any cross section of the first section of through hole 113 in the direction vertical to the axial direction of the ferrule body 11.

In the case of an existing technique, centers of fibers of two ends cannot be entirely consistent, and an error (for example, 1 micrometer) usually exists. An area of a first section of through hole is set, so that a fiber of a peer end can have a higher probability of not touching the ferrule body, reducing wearing of the fiber and prolonging a service life.

That a length d2 of the first section of through hole 113 is greater than or equal to the first preset distance means that the length d2 of the first section of through hole 113 is equal to or slightly greater than the first preset distance.

Optionally, an area of a cross section of the first section of through hole 113 in the direction vertical to the axial direction gradually increases from the bottom 13 to the top 14 of the first section of through hole 113, and the bottom 13 of the first section of through hole 113 is a position at which an area of a cross section of a through hole that is in the through hole 111 and that matches the first part of the fiber starts to exceed the area of the end face of the first end of the fiber 12.

The hole wall of the first section of through hole 113 may be a smooth curved surface, or may be in various other shapes, for example, a step-shaped curved surface.

If the area of the cross section of the first section of through hole 113 gradually increases from the bottom 13 to the top 14 of the first section of through hole 113, and the hole wall of the first section of through hole 113 is a smooth curved surface, an anti-reflection capability of the ferrule is better. In addition, when a conventional MT ferrule abuts the ferrule 100 in this embodiment, the smooth curved surface helps a fiber of the conventional MT ferrule enter the first section of through hole 113 in the through hole 11 of the fiber corresponding to the ferrule 100, so that a core layer of the fiber of the conventional MT ferrule is aligned with a core layer of the fiber of the ferrule 100, ensuring optical transmission reliability.

In addition, if the area of the cross section of the first section of through hole 113 gradually increases from the bottom 13 to the top 14 of the first section of through hole 113, and the hole wall of the first section of through hole 113 is a step-shaped curved surface, optionally, a step position of the hole wall of the first section of through hole 113 is an oblique surface, because the oblique surface helps the fiber of the conventional MT ferrule enter the first section of through hole 113 in the through hole 11 of the fiber corresponding to the ferrule 100, so that the core layer of the fiber of the conventional MT ferrule is aligned with the core layer of the fiber of the ferrule 100, ensuring optical transmission reliability.

Optionally, there is a chamfer 15 at an orifice of the first section of through hole. As shown in FIG. 1 and FIG. 2, an inclination degree of an oblique surface corresponding to a chamfer part is greater than an inclination degree of a non-chamfer part of the first section of through hole.

The chamfer is disposed at the orifice of the first section of through hole. The chamfer is relatively smooth. Therefore, wearing of a ferrule body is relatively small when one ferrule is inserted into or removed from another ferrule. In addition, when a conventional MT ferrule abuts the ferrule in this embodiment, if a fiber of the conventional MT ferrule touches this area, the fiber can be prevented from being damaged. Because the chamfer is disposed at the orifice of the first section of through hole, a size of the orifice of the first section of through hole further increases, further reducing a probability that the fiber that is of the conventional MT ferrule and that protrudes from a ferrule body touches the connection end face of the ferrule body, and further ensuring fiber stability.

Embodiment 4

Based on the foregoing embodiments, setting of the anti-reflection coating of the ferrule in the foregoing embodiments is described in detail in this embodiment.

In this embodiment of this application, the anti-reflection coating is plated on the outer wall of the fiber located inside the first section of through hole 113. The anti-reflection coating may also be plated on the hole wall of the first section of through hole 113, or the anti-reflection coating may not be plated on the hole wall of the first section of through hole 113.

After the ferrule 100 in this embodiment abuts another ferrule, there is a gap between fibers corresponding to the two ferrules. An optical transmission path is fiber→air→fiber, Fresnel reflection occurs because refractive indexes of the fiber and the air are different, and the Fresnel reflection affects optical transmission, causing relatively large loss. In this embodiment, the anti-reflection coating is plated on each of the outer wall of the fiber located inside the first section of through hole 113 and the hole wall of the first section of through hole 113, so that transmission loss, in a non-fiber transmission medium, of a light wave emitted from the fiber can be greatly reduced.

A person skilled in the art should understand that a refractive index of the anti-reflection coating is less than a refractive index of the fiber 12 and is greater than a refractive index of the air, and the anti-reflection coating is configured to suppress reflection of a communications light wave in the non-fiber transmission medium. The communications light wave is a light wave transmitting information in a fiber of an optical communications element.

Optionally, a thickness of the anti-reflection coating is equal to ¼ of a wavelength of the communications light wave. The thickness of the anti-reflection coating is equal to ¼ of the wavelength of the communications light wave, so as to minimize reflection of the light wave in the non-fiber medium.

In an example, because the light wave emitted from the fiber 12 is a divergent light wave, a relatively large part of the light wave is reflected. When the anti-reflection coating whose refractive index falls between the refractive index of the air and the refractive index of the fiber is disposed on the end face 121 of the first end 120 of the fiber 12, when the light wave emitted from the fiber is transmitted in the non-fiber medium, a reflectivity of the light wave is reduced and a transmittance of the light wave is increased, and correspondingly, Fresnel reflection is also reduced, so that light loss is relatively small.

Optionally, the anti-reflection coating includes N layers of films, and N is a positive integer greater than or equal to 1. When N is greater than or equal to 2, refractive indexes of two adjacent layers of films are different.

For example, if the anti-reflection coating includes four layers of films, a refractive index of a first layer of film is different from a refractive index of a second layer of film, and the refractive index of the first layer of film is greater than the refractive index of the second layer of film; the refractive index of the second layer of film is different from a refractive index of a third layer of film, and the refractive index of the second layer of film may be greater than the refractive index of the third layer of film, or may be less than the refractive index of the third layer of film; and the refractive index of the third layer of film is different from a refractive index of a fourth layer of film, and the refractive index of the third layer of film is greater than the refractive index of the fourth layer of film. The refractive index of the first layer of film may be the same as or different from the refractive index of the third layer of film, and the refractive index of the second layer of film may be the same as or different from the refractive index of the fourth layer of film.

In an example, if the refractive index of the fiber is 1.46, and the refractive index of the air is 1.00027 at 20° C. and 760 millimeters of mercury (mmHg), the refractive index of the first layer of film and the refractive index of the third layer of film may be 1.36, and the refractive index of the second layer of film and the refractive index of the fourth layer of film may be 1.28.

A person skilled in the art may understand that if the anti-reflection coating includes a plurality of layers of films, a refractive index of each layer of film is less than the refractive index of the fiber and is greater than the refractive index of the air.

Optionally, a chemical component of each layer of film may be an organic compound. For example, the chemical component of each layer of film included in the anti-reflection coating may be any one of the following organic compounds: a fluorine-containing compound whose refractive index falls between the refractive index of the air and the refractive index of the fiber, an acrylic compound whose refractive index falls between the refractive index of the air and the refractive index of the fiber, and an epoxy compound whose refractive index falls between the refractive index of the air and the refractive index of the fiber.

The fluorine-containing compound may be fluorinated acrylic acid, fluorinated epoxy, or silicone fluorinated epoxy, the acrylic compound may be fluorinated acrylic acid, chlorinated acrylic acid, or the like, and the epoxy compound may be fluorinated epoxy or an epoxy complex.

Optionally, a chemical component of each layer of film may be an inorganic compound. The chemical component of each layer of film included in the anti-reflection coating may be any one of the following inorganic compounds: silicon oxide, tantalum oxide, molybdenum oxide, magnesium oxide, and the like, and a refractive index of each of the inorganic compounds falls between the refractive index of the air and the refractive index of the fiber. The anti-reflection coating may usually be implemented by using the silicon oxide and the tantalum oxide.

For example, if the anti-reflection coating includes four layers of films, a chemical component of a first layer of film is the silicon oxide, a chemical component of a second layer of film is the tantalum oxide, a chemical component of a third layer of film is the silicon oxide, and a chemical component of a fourth layer of film is the tantalum oxide.

Optionally, if the anti-reflection coating is plated on each of the outer wall of the fiber located inside the first section of through hole 113 and the hole wall of the first section of through hole 113, for technical simplicity, a component of the anti-reflection coating on the hole wall of the first section of through hole 113 may be the same as a component of the anti-reflection coating on the outer wall of the fiber located inside the first section of through hole 113.

Embodiment 5

A method for producing the ferrule in any one of the foregoing embodiments is described in this embodiment.

Figure 11:
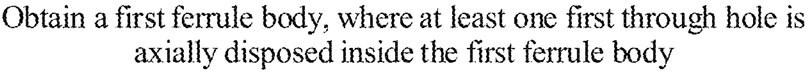
FIG. 11 is a flowchart of a ferrule production method according to an embodiment of this application.

Based on the foregoing embodiments, FIG. 11 is a flowchart of a ferrule production method according to an embodiment of this application. Referring to FIG. 11, the method in this embodiment includes the following steps.

Step S101: Obtain a first ferrule body, where at least one first through hole is axially disposed inside the first ferrule body.

In an example, a method for obtaining the ferrule body may be implemented in the following possible implementations.

In a first possible implementation, the obtained first ferrule body is a current conventional ferrule body, the first through hole of the first ferrule body does not have a first section of through hole, and the first section of through hole is any form of through hole described in any one of the foregoing ferrule embodiments.

A first through hole of the conventional ferrule body also includes two sections, which are referred to as a third section of through hole and a fourth section of through hole herein. A size of the third section of through hole is less than a size of the fourth section of through hole, the size of the third section of through hole matches a size of a part, off which a coating layer is stripped, of a first fiber, and the size of the fourth section of through hole matches a size of a part including the coating layer.

In this implementation, because the current conventional MT ferrule body is directly used, the ferrule body does not need to be reproduced, so that raw materials can be saved.

In a second possible implementation, the first ferrule body is produced through injection molding, the at least one first through hole is axially disposed inside the first ferrule body, and the first through hole includes the first section of through hole in the foregoing embodiment. In other words, the through hole of the ferrule body obtained through injection molding directly includes the first section of through hole. The first section of through hole may be any form described in any one of the foregoing ferrule embodiments, in other words, the first ferrule body is the same as the ferrule body included in the ferrule in any one of the foregoing ferrule embodiments.

In this implementation, the ferrule body including the first section of through hole is directly obtained through injection through injection molding, and, and there is no need to specially form the first section of through hole subsequently, so that the process is simple.

In a third possible implementation, the first ferrule body is produced through machining, the at least one first through hole is axially disposed inside the first ferrule body, and the first through hole includes the first section of through hole in the foregoing embodiment. In other words, the through hole of the ferrule body obtained through machining directly includes the first section of through hole. The first section of through hole may be any form described in any one of the foregoing ferrule embodiments, in other words, the first ferrule body is the same as the ferrule body included in the ferrule in any one of the foregoing ferrule embodiments.

In this implementation, the ferrule body including the first section of through hole is directly obtained through machining, and there is no need to specially form the first section of through hole subsequently, so that the process is simple.

Step S102: Obtain a prefetched ferrule based on the first ferrule body and a first fiber, where one second fiber is inserted into each second through hole of a second ferrule body included in the prefetched ferrule, a vertical distance between an end face of a first end of the second fiber and a plane on which a connection end face of the second ferrule body is located is a first preset distance, and a first end of each second fiber is located inside a corresponding second through hole; and the second through hole includes a first section of through hole, an area of any cross section of the first section of through hole in a direction vertical to an axial direction of the ferrule body is greater than an area of the end face of the first end of the second fiber, a projection of the fiber in the axial direction does not coincide with a projection of the any cross section of the first section of through hole in the direction vertical to the axial direction of the ferrule body, and a plane on which a top of the first section of through hole is located is the plane on which the connection end face of the ferrule is located.

The second ferrule body is any form of ferrule body of the ferrule in any one of the foregoing ferrule embodiments, and the second fiber is a fiber of the ferrule in any one of the foregoing ferrule embodiments.

In an example, a method for obtaining the prefetched ferrule has the following two possible implementations. A first possible implementation corresponds to the first possible implementation of obtaining the first ferrule body, and the second possible implementation corresponds to the second possible implementation and the third possible implementation of obtaining the first ferrule body.

In the first possible implementation, for each through hole of the first ferrule body, the first fiber is inserted into the first through hole, so that an end face that is of an end of the first fiber and that includes no coating layer protrudes from a connection end face of the ferrule body. A part that is of the first fiber and that protrudes from the connection end face of the ferrule body is removed, and starting from a part that is of the first fiber and that is flush with the connection end face of the ferrule body, a first fiber whose length is the first preset distance is removed through grinding by using a grinding machine provided with an etching solution, to obtain the prefetched ferrule including the first section of through hole. A first end of the first through hole is an end close to the connection end face of the ferrule body, the second fiber of the prefetched ferrule is a first fiber obtained after the grinding, the second through hole is a first through hole obtained after the grinding, and the second ferrule body is a ferrule body including the second through hole.

The connection end face of the ferrule body is an end face that is of a finally obtained ferrule and that abuts another ferrule, and the first preset distance is a distance that can leave a gap between a fiber of the finally obtained ferrule and a fiber of another ferrule after the ferrule abuts the another ferrule. The first section of through hole included in the prefetched ferrule may be any form described in any one of the foregoing ferrule embodiments.

In an example, a coating layer of an end that is of the fiber and that is all coated with the coating layer is stripped off, to obtain the first fiber off which a part of coating layer is stripped (in other words, the first fiber in this embodiment is a fiber off which a part of coating layer is stripped). The first fiber includes two parts: one part with no coating layer (hereinafter referred to as a bare fiber part) and the other part with a coating layer (hereinafter referred to as a non-bare fiber part).

The bare fiber part of the first fiber is inserted from a second end of the first through hole. The size of the third section of through hole of the conventional ferrule body matches a size of the bare fiber part of the first fiber, and the size of the fourth section of through hole matches a size of the non-bare fiber part of the first fiber. After the first fiber is inserted into the first through hole of the conventional ferrule body, the bare fiber part is inserted into the third section of through hole, and the non-bare fiber part is inserted into the fourth section of through hole. In this case, a length of the bare fiber part needs to be greater than or equal to a length of the third section of through hole. For example, if the length of the third section of through hole is 5 millimeters (mm), the length of the bare fiber part may be 1 centimeter (cm).

After the insertion is completed, the bare fiber part of the first fiber protrudes from the connection end face of the ferrule body by a distance (if the length of the third section of through hole is 5 mm, and the length of the bare fiber part may be 1 cm, the distance by which the bare fiber part of the first fiber protrudes from the connection end face of the ferrule body is 5 mm). In this case, the first fiber with a protrusion part may be fastened by using glue, and then a bare fiber that is of the first fiber and that protrudes from the ferrule body is cut off by using a cleaver. In this case, an end face of the bare fiber part of the first fiber is flush with the connection end face of the ferrule body, in other words, the end face that is of the first fiber and that includes no coating layer is flush with the connection end face of the ferrule body.

Then, starting from the part that is of the first fiber and that is flush with the connection end face of the ferrule body, the first fiber whose length is the first preset distance is removed through grinding by using the grinding machine provided with the etching solution.

An example implementation is as follows: The etching solution is dripped on grinding paper of the grinding machine. Then the grinding machine is started, a grinding parameter is adjusted, and grinding is performed by using the grinding paper on which the etching solution is dripped. In an example, grinding is performed starting from the part that is of the first fiber and that is flush with the connection end face of the ferrule body, until the first fiber whose length is the first preset distance is removed through grinding. In this case, a rotation speed and grinding pressure of the grinding machine are related to a type of the etching solution. For example, the rotation speed of the grinding machine may be 0.5-8 rounds/minute, and the grinding pressure may be 100-200 bar. The etching solution may be a solution of a lanthanide alkaline earth compound or a solution of a silicate mineral salt.

When the etching solution may be the solution of the lanthanide alkaline earth compound or the solution of the silicate mineral salt, the fiber of the first preset distance may be directly removed through grinding, so that the fiber is dented in the ferrule body by the first preset distance.

When the first fiber whose length is the first preset distance is removed through grinding by using the grinding machine provided with the etching solution, the first end of the first through hole is also ground, so that the first section of through hole can be obtained. Because the etching solution has a polishing effect on a hole wall of the through hole touched by the etching solution, there is a chamfer at an orifice of the first section of through hole.

As described in the foregoing ferrule embodiment, the first preset distance needs to be greater than 1.8 μm, for example, may be 2.5 μm, 2.8 μm, 3 μm, or 3.5 μm. It can be learned that the first preset distance is relatively large. However, in other approaches, only a very short length of fiber, such as 0.6 μm, can be removed through grinding by using a grinding machine alone. In this case, non-contact between fibers of a finally obtained ferrule and a conventional MT ferrule cannot be implemented after the two ferrules abut.

Further, after the first fiber whose length is the first preset distance is removed through grinding by using the grinding machine provided with the etching solution, the first end of the through hole may be further ground by using the grinding machine, so that a size of the obtained first section of through hole is larger.

In this case, the grinding paper on the grinding machine may be silicon dioxide grinding paper of 0.5 μm, and a shape of the finally obtained first section of through hole may be controlled by controlling grinding pressure, hardness of a grinding pad, and a grinding time.

A person skilled in the art may understand that a length of the first section of through hole obtained in this implementation is equal to or slightly greater than the first preset distance, and there is necessarily a chamfer at the orifice of the first section of through hole obtained in this implementation.

In the second possible implementation, the first fiber is inserted into each first through hole, so that an end face of a first end of the first fiber protrudes from a connection end face of the ferrule body by a second preset distance. The end face of the first end of the first fiber is pressed into the first section of through hole by using a fiber stop tooling. The fiber stop tooling is removed to obtain the prefetched ferrule.

A person skilled in the art may understand that, the second fiber of the prefetched ferrule corresponding to this implementation is the first fiber, the second through hole included in the prefetched ferrule is the second through hole included in the first ferrule body, and the second ferrule body is the first ferrule body.

In an example, a process of obtaining the first fiber and a process of inserting the first fiber into the first through hole are the same as those in the foregoing implementation, and details are not described herein again.

That the end face of the first end of the fiber is pressed into the first section of through hole by using the fiber stop tooling includes: pressing, by using the fiber stop tooling, the end face of the first end of the fiber into a position that is flush with a bottom of the first section of through hole; or pressing the end face of the first end of the fiber by using the fiber stop tooling, so that the end face slightly protrudes from a position of a bottom of the first section of through hole. This is related to a thickness of a part that is of the fiber stop tooling and that can be inserted into the through hole of the ferrule body. A length of the first section of through hole obtained in this implementation is equal to or slightly greater than the first preset distance.

Step S103: Plate an anti-reflection coating on an outer wall of a fiber that is of the prefetched ferrule and that is located inside the first section of through hole.

Optionally, the plating an anti-reflection coating on an outer wall of a fiber that is of the prefetched ferrule and that is located inside the first section of through hole may include: plating an anti-reflection coating on the outer wall of the fiber that is of the prefetched ferrule and that is located inside the first section of through hole and a hole wall of the first section of through hole.

As described in any one of the foregoing embodiments, the anti-reflection coating includes N layers of films, and N is a positive integer greater than or equal to 1. When N is greater than or equal to 2, refractive indexes of two adjacent layers of films are different.

Embodiment 6

Based on the foregoing embodiment, this embodiment describes in detail a process of the step of plating an anti-reflection coating on an outer wall of a fiber that is of the prefetched ferrule and that is located inside the first section of through hole, to obtain a ferrule in Embodiment 5.

Currently, a plating method applied to the ferrule field is usually a conventional technique of ion sputtering plating with assistance of vacuum evaporation plating. Currently, in the conventional technique of ion sputtering plating with assistance of vacuum evaporation plating, after a coating-forming substance is sprayed onto a fiber, a temperature of the coating-forming substance is approximately 120 degrees, and almost no optical communications element can tolerate the temperature of approximately 120 degrees. Therefore, the conventional technique of ion sputtering plating with assistance of vacuum evaporation plating is applicable to a case in which a ferrule or a fiber connector including a ferrule is independently produced. Then the independently produced ferrule or fiber connector and an optical communications element body requiring the ferrule or the fiber connector are spliced together, to form an optical communications element.

To implement non-splicing between the ferrule or the fiber connector and the optical communications element body and avoid impact on optical transmission that is caused by an uncertain factor in a splicing process, the ferrule needs to be directly produced on the optical communications element body (in other words, a fiber of the ferrule is a fiber included in the optical communications element), to obtain the optical communications element including the ferrule or the fiber connector. In this case, the conventional technique of ion sputtering plating with assistance of vacuum evaporation plating damages the optical communications element body, and therefore cannot be applied to producing the optical communications element including the ferrule or the fiber connector, and a technique in which a plating temperature is less than a temperature at which the optical communications element body can work normally needs to be used. The following describes, by using implementations, the technique in which the plating temperature is less than the temperature at which the optical communications element body can work normally.

In a first implementation, the anti-reflection coating is plated, by using a spin coating technique, on the outer wall of the fiber that is of the prefetched ferrule and that is located inside the first section of through hole. In this case, a chemical component of the anti-reflection coating may be an organic compound.

Optionally, when surface tension of a compound solution that forms the anti-reflection coating is less than or equal to preset tension, the anti-reflection coating is plated, by using the spin coating technique, on the outer wall of the fiber that is of the prefetched ferrule and that is located inside the first section of through hole. Because a coating-forming substance with small surface tension is not easily laid flat on a coating-forming surface, the coating-forming substance needs to be laid flat on the coating-forming surface by using external force, to obtain a flat anti-reflection coating. Certainly, the spin coating technique may also be used for a coating-forming substance whose surface tension is greater than the preset tension.

When N=4, that the anti-reflection coating is plated, by using the spin coating technique, on the outer wall of the fiber that is of the prefetched ferrule and that is located inside the first section of through hole includes:

d1. Drip, on the outer wall of the fiber that is of the rotating prefetched ferrule and that is located inside the first section of through hole, a first solution of a first organic compound that forms the anti-reflection coating, to obtain a first layer of film of the anti-reflection coating. The first organic compound may be an organic compound whose refractive index is less than a refractive index of the fiber and is greater than a refractive index of air. For example, if the refractive index of the fiber is 1.46, and the refractive index of the air is 1.00027, the first organic compound may be fluoride whose refractive index is 1.36.

d2. Drip, on the first layer of film of the rotating anti-reflection coating, a second solution of a second organic compound that forms the anti-reflection coating, to obtain a second layer of film of the anti-reflection coating. The second organic compound may be an organic compound whose refractive index is less than the refractive index of the fiber and is greater than the refractive index of the air. For example, the second organic compound may be fluoride whose refractive index is 1.28. In this case, the refractive index of the first organic compound is different from the refractive index of the second organic compound.

d3. Drip, on the second layer of film of the rotating anti-reflection coating, the first solution of the first organic compound that forms the anti-reflection coating, to obtain a third layer of film of the anti-reflection coating.

d4. Drip, on the third layer of film of the rotating anti-reflection coating, the second solution of the second organic compound that forms the anti-reflection coating, to obtain the anti-reflection coating.

In this possible implementation, the plating may be implemented at a room temperature, causing no damage to the optical communications element body, and the process may be implemented.

In a second implementation, the anti-reflection coating is plated, by using a spot coating technique, on the outer wall of the fiber that is of the prefetched ferrule and that is located inside the first section of through hole. In this case, a chemical component of the anti-reflection coating may be an organic compound.

Optionally, when surface tension of a compound solution that forms the anti-reflection coating is greater than preset tension, the anti-reflection coating is plated, by using the spot coating technique, on the outer wall of the fiber that is of the prefetched ferrule and that is located inside the first section of through hole. A coating-forming substance with large surface tension is easily laid flat on a coating-forming surface, to obtain a flat anti-reflection coating.

In this possible implementation, the process may be implemented.

In a third implementation, the anti-reflection coating is plated, by using a nanometer embossing technique, on the outer wall of the fiber that is of the prefetched ferrule and that is located inside the first section of through hole. In this case, a chemical component of the anti-reflection coating may be a polymer, for example, a fluoropolymer, an acrylic polymer, or an epoxy polymer.

When N=1, that the anti-reflection coating is plated, by using the nanometer embossing technique, on the outer wall of the fiber that is of the prefetched ferrule and that is located inside the first section of through hole includes:

e1. Coat, on the outer wall of the fiber that is of the prefetched ferrule and that is located inside the first section of through hole, a polymer solution that forms the anti-reflection coating, and press the polymer solution by using a nanomold, so that the polymer solution is filled in a mold cavity of the nanomold.

e2. Cure a polymer in the polymer solution through crosslinking by using a crosslinking technique, to obtain the anti-reflection coating.

e3. Perform photolithography etching on a target area, so that no anti-reflection coating exists in the target area, where the target area is an area in the ferrule body except the hole wall of the first section of through hole and the outer wall of the fiber that is of the prefetched ferrule and that is located inside the first section of through hole.

The crosslinking technique may be light irradiation or thermal crosslinking. Photolithography etching is performed on the target area, so that no anti-reflection coating exists in the target area, in other words, it is ensured that no anti-reflection coating exists in the area other than the hole wall of the first section of through hole and the outer wall of the fiber that is of the prefetched ferrule and that is located inside the first section of through hole. For example, when the connection end face of the ferrule body includes an anti-reflection coating, the connection end face of the ferrule body is no longer flat, and therefore abutting between the ferrule and another ferrule is affected.

When N=2, that the anti-reflection coating is plated, by using the nanometer embossing technique, on the outer wall of the fiber that is of the prefetched ferrule and that is located inside the first section of through hole includes:

f1. Coat, on the outer wall of the fiber that is of the prefetched ferrule and that is located inside the first section of through hole, a first polymer solution that forms the anti-reflection coating, and press the first polymer solution by using a nano mold, so that the first polymer solution is filled in a mold cavity of the nano mold.

f2. Cure a first polymer in the first polymer solution through crosslinking by using a crosslinking technique, to obtain a first layer of film of the anti-reflection coating.

f3. Perform photolithography etching on a target area, so that no anti-reflection coating exists in the target area, where the target area is an area in the ferrule body except the hole wall of the first section of through hole and the outer wall of the fiber that is of the prefetched ferrule and that is located inside the first section of through hole.

f4. Coat, on the first layer of film of the anti-reflection coating, a second polymer solution that forms the anti-reflection coating, and press the second polymer solution by using a nano mold, so that the second polymer solution is filled in a mold cavity of the nano mold.

f5. Cure a second polymer in the second polymer solution through crosslinking by using the crosslinking technique, to obtain the anti-reflection coating.

f6. Perform photolithography etching on the target area, so that no anti-reflection coating exists in the target area.

In this possible implementation, a high-quality anti-reflection coating may be obtained. For example, flatness, density, and the like of the coating are all high.

In a fourth implementation, the anti-reflection coating is plated, by using a technique of ion sputtering plating with assistance of vacuum evaporation plating, on the outer wall of the fiber that is of the prefetched ferrule and that is located inside the first section of through hole. A vacuum degree of the technique of ion sputtering plating with assistance of vacuum evaporation plating falls within a first preset range, an evaporation rate falls within a second preset range, a furnace body temperature is a preset temperature, and a target source is a target source whose purity is greater than or equal to preset purity, so that after a coating-forming substance reaches the outer wall of the fiber, a target temperature of the coating-forming substance is less than a maximum temperature at which a corresponding optical communications element can work normally.

The first preset range is $2\times10^{-5}$-$6\times10^{-5}$ mbar, the second preset range is 0.1-1.5 nm/s, the preset temperature is a room temperature, the preset purity is 99.99%, and the target temperature is 65-75° C.

This possible implementation may be implemented industrially.

In the four implementations, the anti-reflection coating is plated on the outer wall of the fiber that is of the prefetched ferrule and that is located inside the first section of through hole, and the fiber inserted into the ferrule body may be the fiber of the optical communications element. In the first three implementations, a plating temperature may be the room temperature, and the first three implementations are applicable to producing a ferrule on an optical communications element body with low heat resistance performance, for example, a precise optical communications element such as a WSS module or a chip out-light module. The fourth implementation is applicable to producing a ferrule on an optical communications element that can tolerate a temperature between 65° C. and 75° C. and a higher temperature. In this case, a chemical component of the anti-reflection coating may be an inorganic compound such as metal.

In other words, in the four implementations, a corresponding fiber on an optical communications element body may be directly used during ferrule production. Therefore, non-splicing between a ferrule produced by using the method in this embodiment and an optical communications element can be implemented, and an uncertain factor in optical transmission that is caused by splicing between a ferrule or a fiber connector and an optical communications element is avoided, ensuring optical transmission reliability.

A person skilled in the art may understand that the four implementations may also be applied to a process in which a ferrule is not directly produced on an optical communications element body, namely, a process in which a ferrule is independently produced.

If the anti-reflection coating needs to be plated on the outer wall of the fiber that is of the prefetched ferrule and that is located inside the first section of through hole and the hole wall of the first section of through hole, a plating method used is the same as that described above. Details are not described herein again.

Embodiment 7

Figure 12:
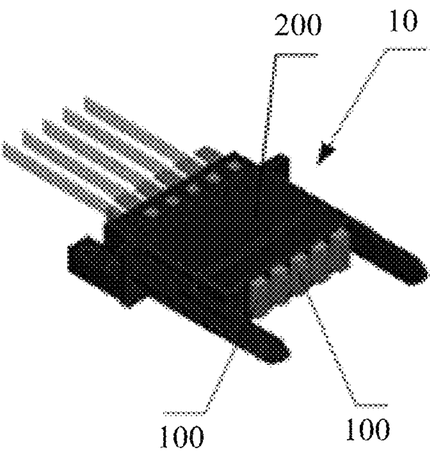
FIG. 12 is a schematic diagram of a fiber connector according to an embodiment of this application.

Based on the foregoing embodiments, this embodiment provides a fiber connector. FIG. 12 is a schematic structural diagram of a fiber connector according to an embodiment of this application.

Further, the fiber connector 10 in this embodiment includes a housing 200 and at least one ferrule 10 in the foregoing embodiments, and the housing 200 is connected to a ferrule body of each ferrule 100.

The housing 200 is configured to fasten each ferrule, and a fastening structure for fastening the ferrule is disposed on an inner wall of the housing 200. A form of the fastening structure may be a structure that can implement fastening in other approaches, for example, a fastening structure clamped to the ferrule.

As shown in FIG. 12, the fiber connector 10 includes a plurality of ferrules 100, and the ferrules 100 may be arranged in an array form (for example, there may be 1 to 3 rows with 2 to 8 ferrules in each row). A person skilled in the art should understand that the fiber connector may include only one ferrule 100.

When the fiber connector in this embodiment abuts a fiber connector including another ferrule, the ferrule 100 of the fiber connector in this embodiment is in contact with the corresponding ferrule of another fiber connector, and there is a gap between a fiber of the fiber connector in this embodiment and a fiber of another fiber connector. In other words, when the two fiber connectors are in contact with each other, ferrule bodies of the two ferrules are in contact with each other, but the fibers of the ferrules of the two connectors are not in contact with each other.

When the fiber connector in this embodiment abuts another fiber connector, insertion/removal reliability is high, an insertion/removal force is small, transmission loss of a light wave emitted from the fiber is small, a service life is long, and production costs are low.

Embodiment 8

Based on the foregoing embodiments, this embodiment provides an optical communications element. In a possible implementation, the optical communications element includes an optical communications element body and at least one ferrule in any one of the foregoing embodiments, and the ferrule is connected to the optical communications element body.

A first implementation of connecting the ferrule to the optical communications element body is that a fiber of the ferrule and a fiber of the optical communications element body are spliced together. A second implementation of connecting the ferrule to the optical communications element body is that the ferrule is connected to the optical communications element body by sharing a fiber.

For the first implementation of connecting the ferrule to the optical communications element body, after the ferrule is produced according to any one of the implementable ferrule production methods described in Embodiment 5 and Embodiment 6, the ferrule is connected to the optical communications element body.

For the second implementation of connecting the ferrule to the optical communications element body, the ferrule may be obtained according to the method that is described in Embodiment 5 or Embodiment 6 and that is applicable to a case of connecting a ferrule body to a fiber extended from the optical communications element body. In this case, an optical communications element including the ferrule is obtained.

In this case, the optical communications element may be an optical backplane, a fiber beam backplane, a chip out-light module, or a wavelength selective switch (WSS) module. The ferrule needs to be assembled into a fiber connector only when the optical communications element needs to be assembled with another corresponding optical communications element.

For the optical communications element corresponding to the second implementation of connecting the ferrule to the optical communications element body, because the ferrule is connected to the optical communications element body by sharing a fiber, non-splicing between the ferrule and the optical communications element is implemented, so that an uncertain factor in optical transmission that is caused by splicing between the ferrule and the optical communications element is avoided, ensuring optical transmission reliability.

In another possible implementation, the optical communications element includes an element body and at least one fiber connector, each fiber connector includes at least one ferrule in any one of the foregoing embodiments, and the ferrule is connected to the optical communications element body.

For a manner of connecting the ferrule to the optical communications element body, refer to the implementations in the foregoing embodiment. Details are not described again in this embodiment. A difference from the optical communications element in the foregoing implementation is that in this implementation, the ferrule of the optical communications element is fastened to a housing, to obtain the fiber connector. In this case, the optical communications element may be a board.

Embodiment 9

Based on the foregoing embodiments, this embodiment provides a communications device. The communications device includes a second communications element in Embodiment 8 and a first optical communications element, and the first communications element is connected to the second communications element by using respective fiber connectors.

Figure 13:
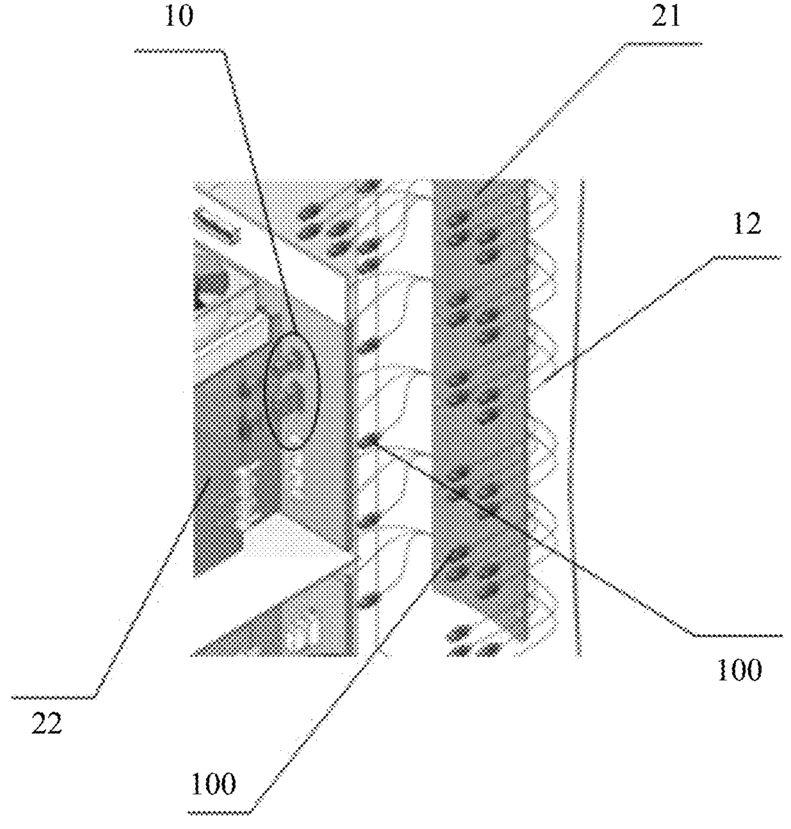
FIG. 13 is a schematic diagram of a connection between a first optical communications element and a second communications element according to an embodiment of this application.

FIG. 13 is a schematic diagram of a connection between a first optical communications element and a second communications element according to an embodiment of this application. FIG. 13 is a schematic diagram in which a second optical communications element optical backplane 21 and a first optical communications element board 22 are assembled. 12 represents a fiber in the figure.

When the optical backplane 21 is not assembled with the board 22, the optical backplane 21 includes a plurality of ferrules in any one of the foregoing embodiments. The board 22 has a plurality of fiber connectors in the foregoing embodiment, and each fiber connector includes at least one ferrule 100 in the foregoing embodiment. When the optical backplane 21 needs to be connected to the board 22, the ferrule of the optical backplane 21 forms at least one fiber connector 10 that matches a fiber connector of the board 21, and then the fiber connector of the optical backplane 21 is connected to the fiber connector of the board 22, to assemble the optical backplane 21 with the board 22.

The following describes a performance test result of a fiber connector including at least one ferrule in any one of the foregoing embodiments.

Figure 14:
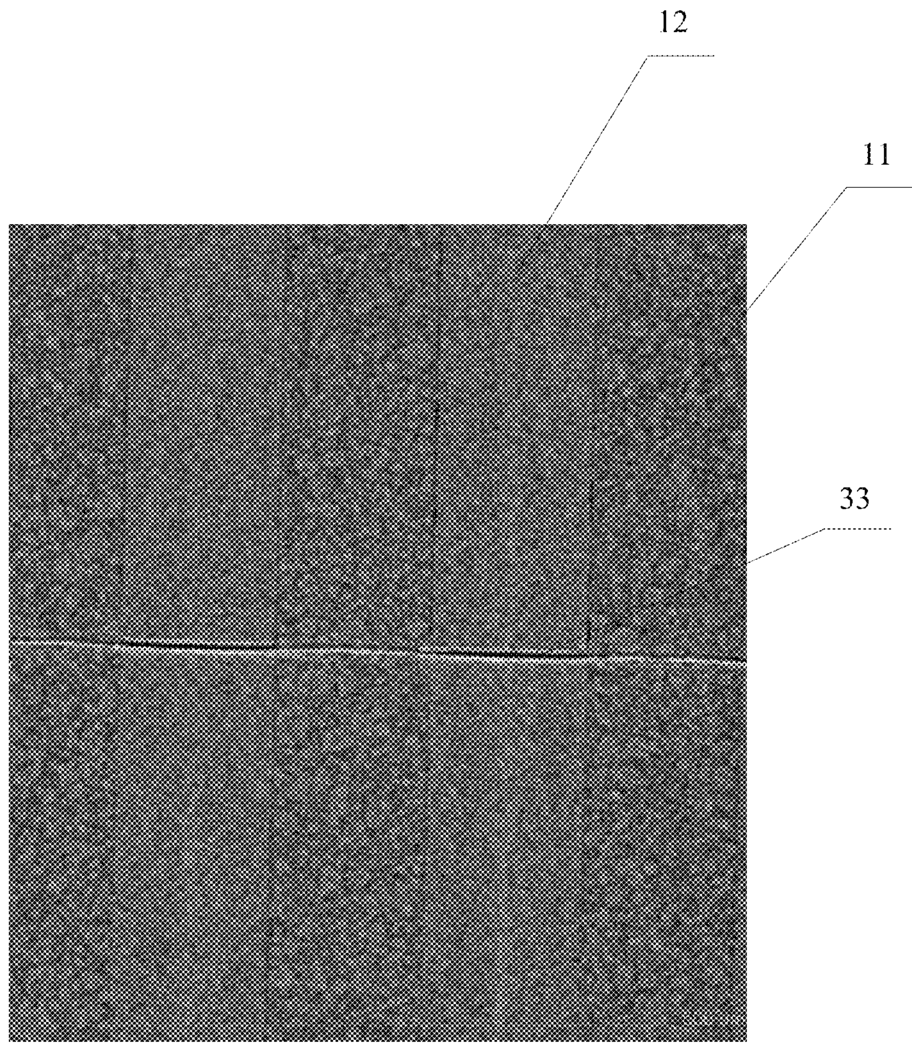
FIG. 14 is a diagram of a test result of a gap between respective fibers after two fiber connectors abut according to an embodiment of this application.
Figure 15:
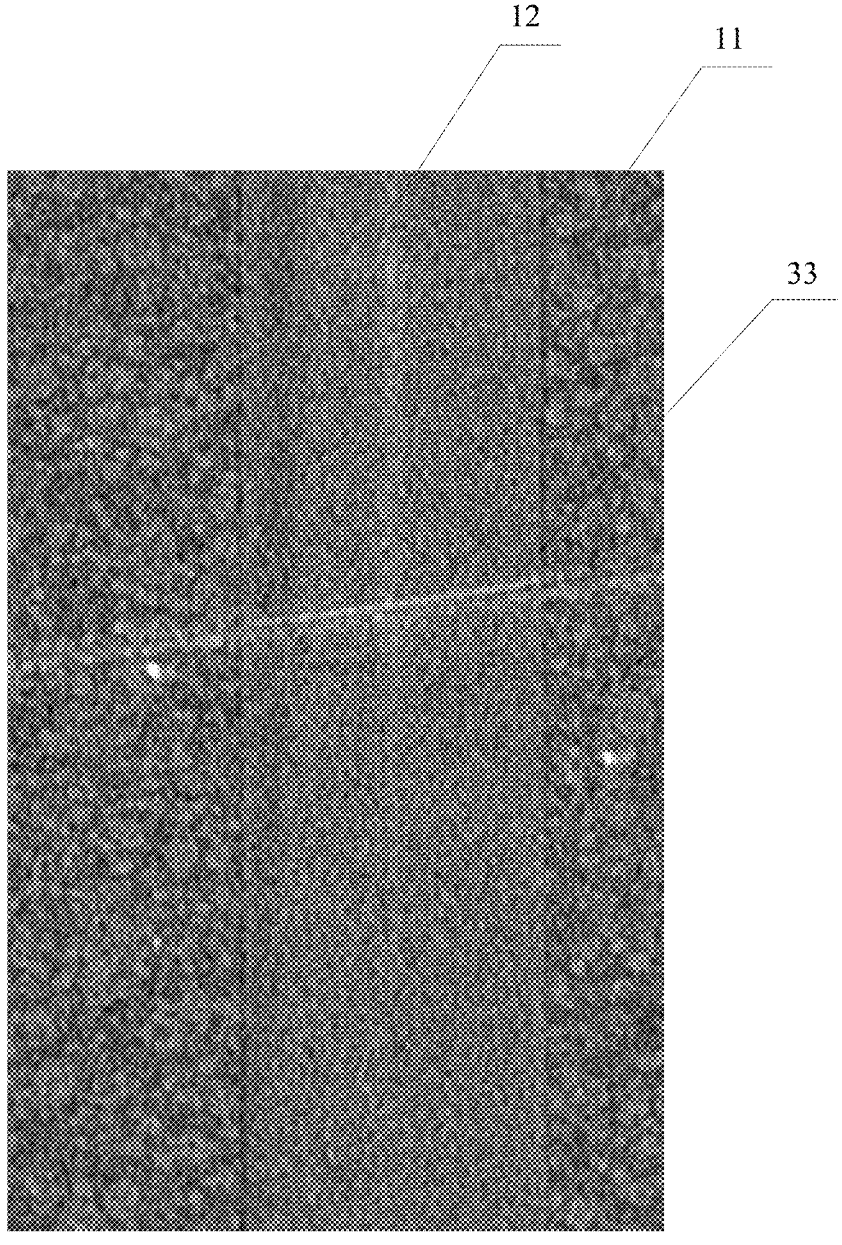
FIG. 15 is a diagram of a test result of a gap between respective fibers after two fiber connectors abut according to an embodiment of this application.
Figure 16:
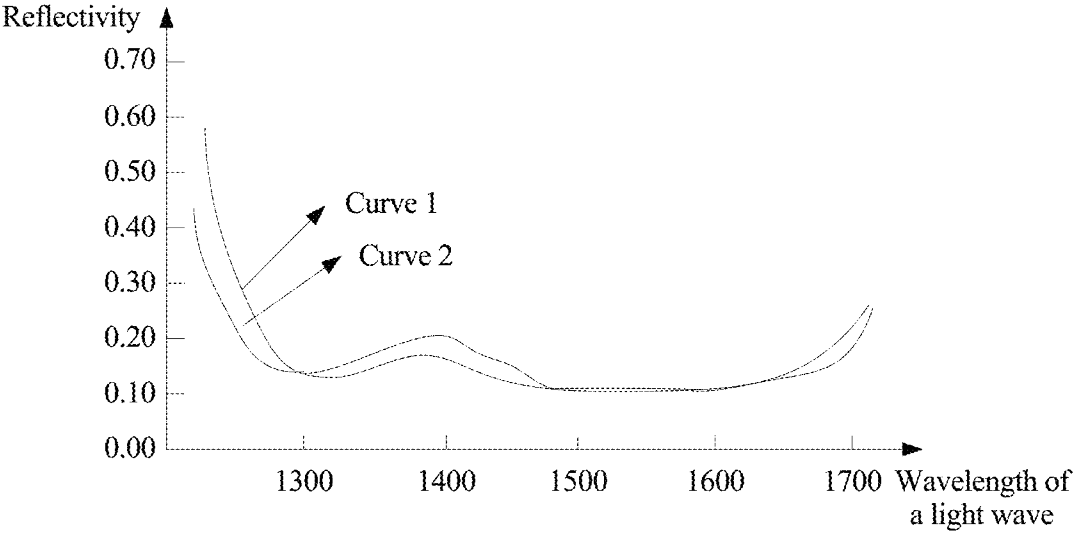
FIG. 16 is a test result diagram of anti-reflection performance of an anti-reflection coating of a fiber connector according to an embodiment of this application.

FIG. 14 is a diagram 1 of a test result of a gap between respective fibers after two fiber connectors abut according to an embodiment of this application. FIG. 15 is a diagram 2 of a test result of a gap between respective fibers after two fiber connectors abut according to an embodiment of this application. FIG. 16 is a test result diagram of anti-reflection performance of an anti-reflection coating of a fiber connector according to an embodiment of this application.

A test result of a gap between respective fibers after two fiber connectors (one fiber connector is the fiber connector in this embodiment of this application) abut is first described.

In an example, a test method for the gap between respective fibers after two fiber connectors abut is as follows: A plurality of pairs of fiber connectors are tested by using a nondestructive computerized tomography (CT) device. At least one fiber connector in each pair of fiber connectors is the fiber connector in this embodiment of this application.

If each of the two fiber connectors is the fiber connector in this embodiment of this application, a result of connecting the two fiber connectors that is obtained through nondestructive CT scanning is shown in FIG. 14. Referring to FIG. 14, 11 represents a ferrule body, and 12 represents a fiber inserted into a through hole of the ferrule body. It can be learned from FIG. 14 that there is an obvious gap 33 between fibers of the two fiber connectors, and the gap shown in the figure is a gap between anti-reflection coatings on end faces of the respective fibers of the two fiber connectors.

If one of the two abutting fiber connectors is the fiber connector in this embodiment of this application, and the other fiber connector is a conventional angled physical contact (APC) MT ferrule fiber connector, a result of connecting the two fiber connectors that is obtained through nondestructive CT scanning is shown in FIG. 15. A fiber of the conventional APC MT ferrule fiber connector protrudes from a connection end face of a ferrule body by 3 μm-3.5 μm.

Referring to FIG. 15, 11 represents a ferrule body, and 12 represents a fiber inserted into a through hole of the ferrule body. It can be learned from FIG. 15 that there is a gap 33 between fibers of the two fiber connectors, and the gap shown in the figure is a gap between anti-reflection coatings on end faces of the respective fibers of the two fiber connectors.

The foregoing test proves that fibers of the fiber connector in this embodiment and any type of ferrule fiber connector can be in non-physical contact after the two fiber connectors are connected, so that an insertion/removal force can be reduced.

In addition, a test result of a distance by which a fiber of the fiber connector provided in this embodiment of this application is dented in a connection end face is described.

Table 1 shows the test result of the distance by which the fiber of the ferrule provided in this embodiment of this application is dented in the connection end face. An instrument used to test the distance by which the fiber of the ferrule is dented in the connection end face is a DAISI-MT-V3 three-dimensional (3D) interferometer.

Table 1 shows eight ferrules. Distances by which 12 fibers of each ferrule are dented in a connection end face of a ferrule body are a first preset distance. It can be learned from Table 1 that the distances by which the fibers are dented in the connector end face of the ferrule body are all at least 3.5 μm. In other words, according to the ferrule in this embodiment, the distance by which the fiber is dented in the connection end face of the ferrule body can be at least 3.5 μm.

A distance by which a fiber of a current conventional MT ferrule fiber connector protrudes from a connection end face of a ferrule body is less than 3.5 μm. Therefore, after a fiber connector including the ferrule in this embodiment abuts the conventional MT ferrule fiber connector, fibers of the two fiber connectors can still be in non-physical contact. In this case, after the fiber connector including the ferrule in this embodiment abuts another type of MT ferrule fiber connector, fibers of the two fiber connectors are not in physical contact.

TABLE 1

Test Result of a Distance by which a Fiber of a Ferrule is Dented in a Connection End Face

| Fiber | Ferrule number<br>Fiber denting value/nm | | | | | | | |
|---|---|---|---|---|---|---|---|---|
| number | BSN1 | BSN2 | BSN3 | BSN4 | BSN5 | BSN6 | BSN7 | BSN8 |
| 1 | −3756.32 | −3751.32 | −3828.35 | −3846.65 | −3662.52 | −3728.97 | −3667.9 | −3612.94 |
| 2 | −3753.2 | −3751.12 | −3808.69 | −3767.29 | −3676.31 | −3661.9 | −3649.44 | −3557.75 |

TABLE 1-continued

Test Result of a Distance by which a Fiber of a Ferrule is Dented in a Connection End Face

| Fiber number | Ferrule number Fiber denting value/nm | | | | | | | |
|---|---|---|---|---|---|---|---|---|
| | BSN1 | BSN2 | BSN3 | BSN4 | BSN5 | BSN6 | BSN7 | BSN8 |
| 3 | −3750.05 | −3728.12 | −3795.68 | −3774.98 | −3679.49 | −3702.19 | −3591.88 | −3584.46 |
| 4 | −3733.17 | −3693.88 | −3778.93 | −3732.12 | −3645.82 | −3643.47 | −3584.14 | −3606.64 |
| 5 | −3670.45 | −3737.58 | −3706.7 | −3705.22 | −3647.71 | −3702.02 | −3604.38 | −3557.55 |
| 6 | −3662.55 | −3674.24 | −3701.23 | −3695.48 | −3584.72 | −3610.94 | −3516.95 | −3587.18 |
| 7 | −3684.25 | −3715.84 | −3714.68 | −3704.03 | −3597.59 | −3628.55 | −3533.29 | −3582.92 |
| 8 | −3708.68 | −3692.25 | −3733.62 | −3691.77 | −3623.38 | −3634.18 | −3550.09 | −3510.18 |
| 9 | −3761.28 | −3720.44 | −3714.63 | −3702.84 | −3633.14 | −3685.68 | −3541.2 | −3558.42 |
| 10 | −3733.97 | −3779.54 | −3770.3 | −3743.86 | −3687.55 | −3775.65 | −3666.8 | −3655.51 |
| 11 | −3764.51 | −3831.03 | −3799.34 | −3781.93 | −3701.42 | −3762.45 | −3751.85 | −3704.75 |
| 12 | −3809.54 | −3852.73 | −3834.76 | −3822.62 | −3777.02 | −3844.79 | −3787.62 | −3765.09 |

Then a test result of insertion/removal performance of the fiber connector provided in this embodiment of this application is described.

A method for testing insertion/removal performance is as follows: 184 pairs of to-be-inserted/removed samples are used. Each pair of samples are a conventional APC MT ferrule fiber connector and a fiber connector including the ferrule in this embodiment of this application. A test result is obtained after insertion and removal are performed between each pair of samples 1000 times. From the start to the end of the test, an insertion loss (IL) is always less than 0.25 decibels (dB), and a nominal value is approximately 0.10 dB, and a loss change is always less than 0.06 dB. It indicates that when the fiber connector including the ferrule in this embodiment of this application abuts another fiber connector, an abutting force is small, loss of the fiber connector is relatively small, and a service life is long.

Further, a test result of anti-reflection performance of the fiber connector provided in this embodiment of this application is described.

The anti-reflection performance may be tested by using an elliptical polarization spectrometer. A test sample is an optical probe on which the anti-reflection coating on the end face of the fiber in this embodiment is plated. In FIG. 16, a curve 1 is a test curve of a reflectivity of an optical probe on which an anti-reflection coating including silicon metal and tantalum metal is plated, and a curve 2 is a test curve of a reflectivity of an optical probe on which an anti-reflection coating of fluoride is plated.

It can be learned from FIG. 16 that reflectivities of the foregoing two series of reflection coatings are less than 0.2% in a band of 1260 nanometers (nm)-1620 nm, and 1260 nm-1620 nm is a conventional optical communication band. For example, it can be learned from the curve 1 that when a wavelength of a light wave is 1260 nm, a reflectivity is approximately 0.16%; when a wavelength of a light wave is 1490 nm, a reflectivity is approximately 0.10%; when a wavelength of a light wave is 1550 nm, a reflectivity is approximately 0.07%; and when a wavelength of a light wave is 1620 nm, a reflectivity is approximately 0.08%.

It indicates that the anti-reflection performance of the anti-reflection coating on the end face of the fiber in this embodiment of this application is high, and transmission loss of light is relatively small, ensuring optical transmission reliability.

The foregoing descriptions are merely implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A ferrule, comprising:
- a ferrule body aligned along an axial direction of the ferrule, wherein the ferrule body comprises:
  - a connection end face; and
  - a through hole comprising a first section that terminates into a concave orifice having a chamfer, wherein the first section is axially disposed inside the ferrule body, and wherein the chamfer and the connection end face are located on a first plane; and
- a fiber configured to be inserted into the through hole, wherein the fiber comprises a first fiber end, wherein the first fiber end comprises a first end face that is disposed at a first distance inside the concave orifice, wherein all outer walls of the first fiber end that are disposed at the first distance include an anti-reflection coating, wherein all internal walls of the concave orifice include the anti-reflection coating, wherein each cross section area of the ferrule body in the first section and in a vertical direction to the axial direction is greater than an area of the first end face, and wherein a projection of the fiber in the axial direction does not coincide with a projection of the each cross section,
- wherein a vertical distance between the first end face and the first plane is a first preset distance,
- wherein the connection end face is configured to abut another ferrule, and
- wherein the first preset distance is configured to leave a gap between the first end face and a second fiber of the other ferrule when the ferrule abuts the other ferrule.

2. The ferrule of claim 1, wherein the concave orifice is defined by tapered internal walls extending from the chamfer inward toward the first section, and wherein the anti-reflection coating continuously covers all of the tapered internal walls.

3. The ferrule of claim 1, wherein the each cross section area increases from a bottom of the first section to a top of the first section, wherein the bottom is a second top of a second section of the through hole, and wherein the second section is other than the first section.

4. The ferrule of claim 1, wherein a length of the first section is greater than or equal to the first preset distance.

5. The ferrule of claim 1, wherein the ferrule body comprises the chamfer at an edge of the concave orifice of the first section.

6. The ferrule of claim 1, wherein the first preset distance is greater than 1.8 micrometers (μm).

7. A fiber connector, comprising:

a housing; and a ferrule configured to be fastened to the housing, wherein the ferrule comprises a ferrule body and at least one fiber, wherein the ferrule body is aligned along an axial direction of the ferrule body and comprises:

a connection end face;

a through hole comprising a first section that terminates into a concave orifice having a chamfer, wherein the through hole is axially disposed inside the ferrule body, wherein the chamfer and the connection end face are located on a first plane; and a fiber configured to be inserted into the through hole, wherein the fiber comprises a first fiber end, wherein the first fiber end comprises a first end face that is disposed at a first distance inside the concave orifice, wherein all outer walls of the first fiber end that are disposed at the first distance include an anti-reflection coating, wherein all internal walls of the concave orifice include the anti-reflection coating, wherein each cross section area of the ferrule body in the first section and in a vertical direction to the axial direction is greater than an area of the first end face, and wherein a projection of the fiber in the axial direction does not coincide with a projection of the each cross section, wherein a vertical distance between the first end face and the first plane is a first preset distance, wherein the connection end face is configured to selectively abut another ferrule, and wherein the first preset distance is configured to leave a gap between the first end face and a second fiber of the other ferrule when the ferrule abuts the other ferrule.

8. The fiber connector of claim 7, wherein the concave orifice is defined by tapered internal walls extending from the chamfer inward toward the first section, and wherein the anti-reflection coating continuously covers all of the tapered internal walls.

9. The fiber connector of claim 7, wherein the each cross section area increases from a bottom of the first section to a top of the first section, wherein the bottom is a second top of a second section of the through hole, and wherein the second section is other than the first section.

10. The fiber connector of claim 7, wherein a length of the first section is greater than or equal to the first preset distance.

11. The fiber connector of claim 7, wherein the ferrule body comprises the chamfer at an edge of the concave orifice of the first section.

12. The fiber connector of claim 7, wherein the first preset distance is greater than 1.8 micrometer (μm).

13. An optical communications element, comprising:

an optical communications element body; and a ferrule connected to the optical communications element body, wherein the ferrule comprises a ferrule body and at least one fiber, wherein the ferrule body is aligned along an axial direction of the ferrule body and comprises:

a connection end face;

a through hole comprising a first section that terminates into a concave orifice having a chamfer, wherein the through hole is axially disposed inside the ferrule body, wherein the chamfer and the connection end face are located on a first plane, wherein each cross section area of the ferrule body in the first section and in a vertical direction to the axial direction is greater than an area of a first end face of a first fiber end, and wherein a projection of the fiber in the axial direction does not coincide with a projection of the each cross section area; and a fiber configured to be inserted into the through hole, wherein the fiber comprises the first fiber end, wherein the first fiber end comprises the first end face that is disposed at a first distance inside the concave orifice, wherein all outer walls of the first fiber end that are disposed at the first distance include an anti-reflection coating, wherein all internal walls of the concave orifice include the anti-reflection coating, wherein each cross section area of the ferrule body in the first section and in a vertical direction to the axial direction is greater than an area of the first end face, and wherein a projection of the fiber in the axial direction does not coincide with a projection of the each cross section, wherein a vertical distance between the first end face and the first plane is a first preset distance, wherein the connection end face is configured to abut another ferrule, and wherein the first preset distance is configured to leave a gap between the first end face and a second fiber of the other ferrule when the ferrule abuts the other ferrule.

14. The optical communications element of claim 13, wherein the concave orifice is defined by tapered internal walls extending from the chamfer inward toward the first section, and where the anti-reflection coating continuously covers all of the tapered internal walls.

15. The optical communications element of claim 13, wherein the each cross section area increases from a bottom of the first section to a top of the first section, wherein the bottom is a second top of a second section of the through hole, and wherein the second section is other than the first section.

16. The optical communications element of claim 13, wherein a length of the first section is greater than or equal to the first preset distance.

17. The optical communications element of claim 13, wherein the ferrule body comprises the chamfer at an edge of the concave orifice of the first section.

18. The optical communications element of claim 13, wherein the first preset distance is greater than 1.8 micrometer (μm).

19. The ferrule of claim 1, wherein the first distance is 0.3 micrometer (μm).

20. The fiber connector of claim 7, wherein the first distance is 0.5 micrometer (μm).

21. The optical communications element of claim 13, wherein the first distance is 0.3 micrometer (μm) or 0.5 μm.

* * * * *